(12) United States Patent
Bauer et al.

(10) Patent No.: US 7,770,315 B2
(45) Date of Patent: Aug. 10, 2010

(54) SYSTEM FOR MOUNTING FRAME

(75) Inventors: Alan M. Bauer, Medina, OH (US);
Viorel Berlovan, Medina, OH (US)

(73) Assignee: Moen Incorporated, North Olmsted, OH (US)

( * ) Notice: Subject to any disclaimer, the term of this patent is extended or adjusted under 35 U.S.C. 154(b) by 342 days.

(21) Appl. No.: 11/828,602

(22) Filed: Jul. 26, 2007

(65) Prior Publication Data
US 2009/0026343 A1    Jan. 29, 2009

(51) Int. Cl.
*A47G 1/16* (2006.01)
*A47G 1/06* (2006.01)
*A47G 1/10* (2006.01)
*A47G 1/08* (2006.01)
*G09F 7/00* (2006.01)
*B25G 3/08* (2006.01)
*F16B 12/46* (2006.01)
*E04C 2/38* (2006.01)

(52) U.S. Cl. ............... 40/762; 40/781; 40/782; 40/783; 40/784; 40/785; 40/209; 40/741; 40/759; 403/382; 403/403; 52/656.9

(58) Field of Classification Search ............... 40/762, 40/783, 782, 759, 781, 784, 785, 741, 209; 52/656.9; 403/382, 403
See application file for complete search history.

(56) References Cited

U.S. PATENT DOCUMENTS

| | | | |
|---|---|---|---|
| 990,067 A | 4/1911 | Scott | |
| 2,137,156 A | 11/1938 | Clark | |
| 2,791,051 A | 5/1957 | Scheyer | |
| 2,900,750 A | 8/1959 | Buelow | |
| 2,928,199 A | 3/1960 | Novak | |
| 3,365,827 A | 1/1968 | Leif | |
| 3,946,512 A | 3/1976 | Shapiro | |
| 4,283,038 A | 8/1981 | Kurtz | |
| 4,385,744 A | 5/1983 | Sherman et al. | |
| 4,428,135 A * | 1/1984 | Sobel | 40/782 |
| 4,467,543 A | 8/1984 | Townsend | |
| 4,499,679 A | 2/1985 | Sherman | |
| 4,531,315 A | 7/1985 | Sobel | |
| 4,606,526 A | 8/1986 | Rabinowitz | |
| 4,662,092 A * | 5/1987 | Kim | 40/784 |
| 4,712,761 A | 12/1987 | Wassell | |
| 4,922,638 A | 5/1990 | Litvak et al. | |
| 4,996,784 A | 3/1991 | Hsu | |
| 5,448,841 A | 9/1995 | Hampton | |
| 5,579,596 A | 12/1996 | Kovacs et al. | |
| 5,832,646 A | 11/1998 | Albin et al. | |
| 5,842,298 A | 12/1998 | Gephart et al. | |
| 5,933,996 A | 8/1999 | Chang | |
| 6,065,236 A | 5/2000 | Schneider | |
| 6,076,329 A | 6/2000 | Thomson | |
| 6,095,478 A | 8/2000 | Barnes | |
| 6,347,472 B1 | 2/2002 | Dominguez | |

(Continued)

*Primary Examiner*—Lesley D Morris
*Assistant Examiner*—Syed A Islam
(74) *Attorney, Agent, or Firm*—Calfee, Halter & Griswold LLP

(57) ABSTRACT

A system for mounting a frame (e.g., a mirror frame) allows the frame to be easily installed, securely mounted and readily replaced without damaging the mounting surface (e.g., the surrounding wall or mirror) or the frame. No tools are required to mount or unmount the frame. The mounting hardware is concealed within the frame.

17 Claims, 18 Drawing Sheets

U.S. PATENT DOCUMENTS

| | | |
|---|---|---|
| 6,377,320 B1 * | 4/2002 | Ananian et al. ............. 348/836 |
| 6,484,996 B2 | 11/2002 | Astell |
| 6,550,172 B2 | 4/2003 | Korpai |
| 6,612,060 B2 | 9/2003 | Pearce |
| 6,865,836 B2 | 3/2005 | Sachs-Lavery |
| 6,928,762 B1 | 8/2005 | Fattahi |
| 7,093,403 B2 | 8/2006 | Huntting et al. |
| 7,121,030 B2 | 10/2006 | Schneider |
| 7,147,196 B2 | 12/2006 | Knight et al. |
| 2001/0037593 A1 | 11/2001 | Korpai |
| 2001/0047605 A1 | 12/2001 | Schneider |
| 2002/0170216 A1 | 11/2002 | Pearce |
| 2003/0038222 A1 | 2/2003 | Holmes |
| 2005/0055907 A1 | 3/2005 | Huntting et al. |
| 2005/0252059 A1 | 11/2005 | Marks et al. |
| 2006/0196148 A1 | 9/2006 | Huntting et al. |

* cited by examiner

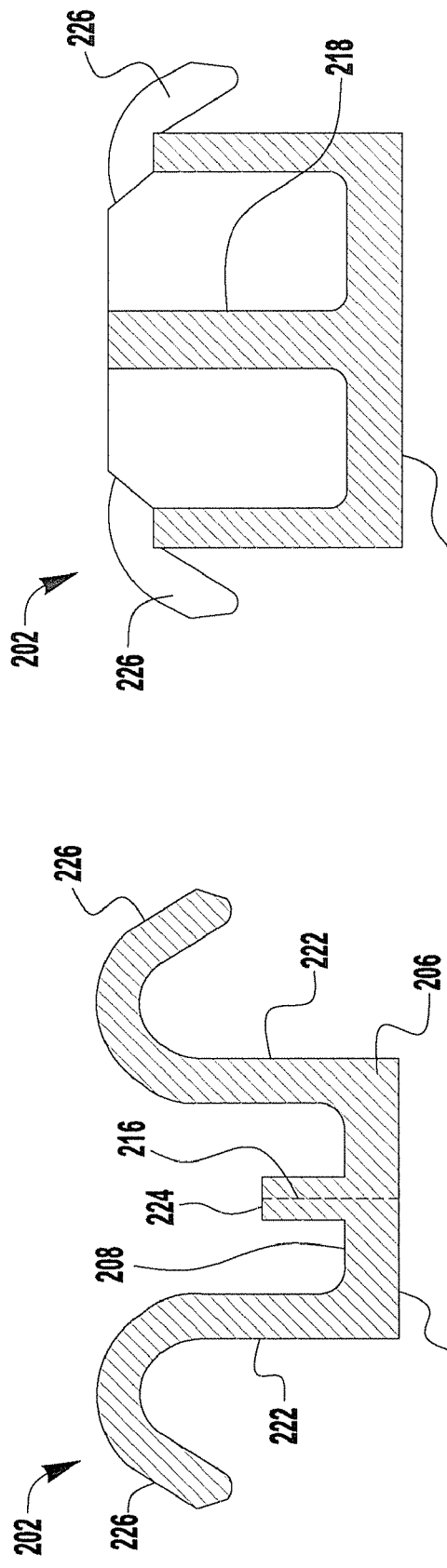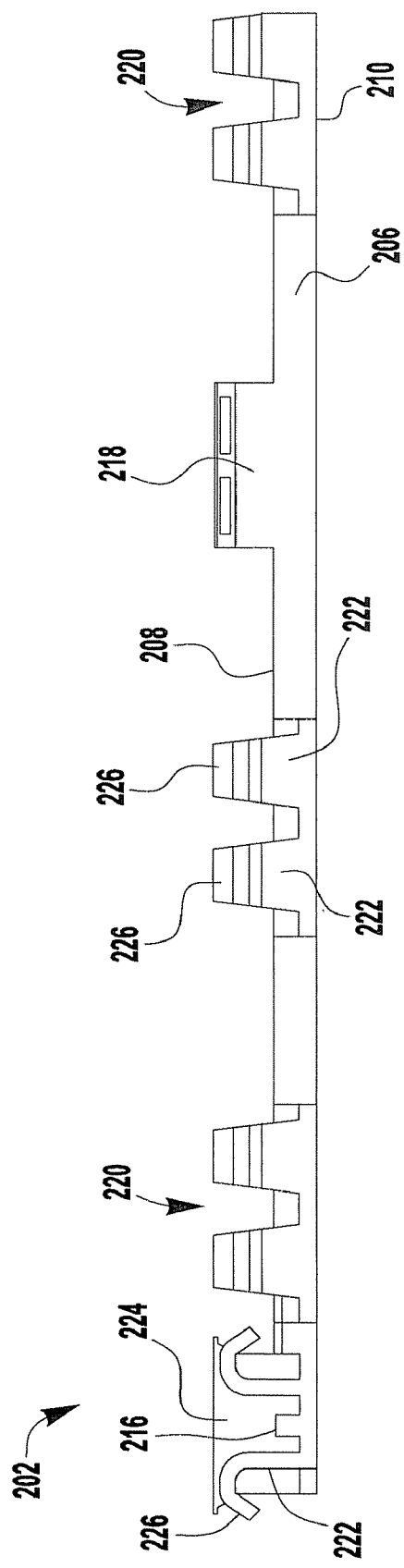

SECTION A-A

SECTION A-A

SECTION A-A

SYSTEM FOR MOUNTING FRAME

FIELD

The invention relates generally to mounting systems and, more particularly, to a system for mounting a frame.

BACKGROUND

Mirrors are a common fixture in homes and offices. For example, a mirror is frequently located above a sink in a bathroom. Most modern mirrors consist of a thin layer of metal (e.g., aluminum, tin) deposited on a sheet of glass. This layer is called the tain. Light enters the mirror and reflects off the tain so that a user looking in the mirror sees a reflected image of nearby objects. The tain may be covered by an additional layer that protects the tain from corrosion.

Nonetheless, over time, the mirror can become cloudy, discolored or otherwise tarnished near its edges due to corrosion of the tain, for example, from exposure to cleaning solutions. Placement of a frame about the edges of the mirror can conceal these cloudy, discolored or tarnished portions of the mirror. A frame can also function as a decorative element for accenting the mirror.

A conventional frame is applied to a mirror by gluing the frame around and/or on the mirror. In particular, an adhesive is used to secure the frame to a wall that the mirror is mounted on and/or directly to the mirror. Consequently, the frame cannot be readily replaced. Instead, removing the frame after it is glued to the wall and/or the mirror requires exerting a force on the frame sufficient to overcome the adhesive force of the glue. Exerting the force on the frame can result in the frame, the wall and/or the mirror being damaged.

Because the conventional frame cannot be readily replaced, the frame may no longer match the decor of a room containing the mirror as the room's decor is changed. Consequently, there is a need in the art for a mirror frame mounting system that allows a mirror frame to be easily installed, securely mounted and readily replaced without damaging the mounting surface (e.g., the surrounding wall, the mirror) or the mirror frame.

SUMMARY

In view of the above, it is an exemplary aspect to provide a system for mounting a frame that allows the frame to be easily installed, securely mounted and readily replaced without damaging the mounting surface (e.g., the surrounding wall) or the frame. No tools are required to mount the frame.

It is another exemplary aspect to provide a system for mounting a frame on a structure (e.g., a mirror). The system includes brackets that are semi-permanently attached to the mirror. The system also includes frame components. Each of the brackets includes one or more fasteners. Each of the frame components includes a groove accessible via its lower surface. The frame components can be attached to the brackets by pressing the frame components onto the brackets such that the fasteners on the brackets enter the grooves. The frame components can then be detached from the brackets by pulling the frame components off of the brackets such that the fasteners on the brackets exit the grooves.

It is yet another aspect to provide an apparatus for mounting a frame component on a structure (e.g., a mirror). The apparatus includes a bracket for semi-permanently attaching to the structure. The bracket includes at least one fastener which is operable to interface with a groove in the frame component to detachably mount the frame component on the bracket.

It is still another exemplary embodiment to provide a system for mounting a frame in which the mounting hardware is concealed within the frame.

Numerous other advantages and features will become readily apparent from the following detailed description of exemplary embodiments, from the claims and from the accompanying drawings.

BRIEF DESCRIPTION OF THE DRAWINGS

The above aspects and additional aspects, features and advantages will become readily apparent by describing in detail exemplary embodiments thereof with reference to the attached drawings, wherein like reference numerals denote like elements, and:

FIGS. 3A-3F show a corner bracket, according to one exemplary embodiment, of the mirror frame mounting system of FIG. 1. FIG. 3A is a perspective view of the corner bracket. FIG. 3B is a top or front plan view of the corner bracket. FIG. 3C is a bottom or rear plan view of the corner bracket. FIG. 3D is a cross-sectional view of the corner bracket of FIG. 3C, along line A-A. FIG. 3E is a cross-sectional view of the corner bracket of FIG. 3C, along line B-B. FIG. 3F is a side elevational view of the corner bracket.

FIG. 5A is a perspective view of the side bracket. FIG. 5B is a top or front plan view of the side bracket. FIG. 5C is a bottom or rear plan view of the side bracket. FIG. 5D is a lengthwise side elevational view of the side bracket. FIG. 5E is a cross-sectional view of the side bracket of FIG. 5D, along line A-A. FIG. 5F is a widthwise side elevational view of the side bracket.

FIG. 6A is a perspective view of the corner frame. FIG. 6B is a top or front plan view of the corner frame. FIG. 6C is a bottom or rear plan view of the corner frame. FIG. 6D is a side elevational view of the corner frame. FIG. 6E is a cross-sectional view of the corner frame of FIG. 6B, along line A-A.

FIG. 7A is a perspective view of the side frame. FIG. 7B is a top or front plan view of the side frame. FIG. 7C is a lengthwise side elevational view of the side frame. FIG. 7D is a widthwise side elevational view of the side frame.

FIG. 8A is a perspective view of the side joint frame. FIG. 8B is a top or front plan view of the side joint frame. FIG. 8C is a bottom or rear plan view of the side joint frame. FIG. 8D is a side elevational view of the side joint frame. FIG. 8E is a cross-sectional view of the side joint frame of FIG. 8B, along line A-A.

FIG. 9A is a perspective view of the corner template. FIG. 9B is a top or front plan view of the corner template. FIG. 9C is a bottom or rear plan view of the corner template. FIG. 9D is a side elevational view of the corner template.

FIG. 10A is a perspective view of the side template. FIG. 10B is a top or front plan view of the side template. FIG. 10C is a side elevational view of the side template.

DETAILED DESCRIPTION

Figure 1:
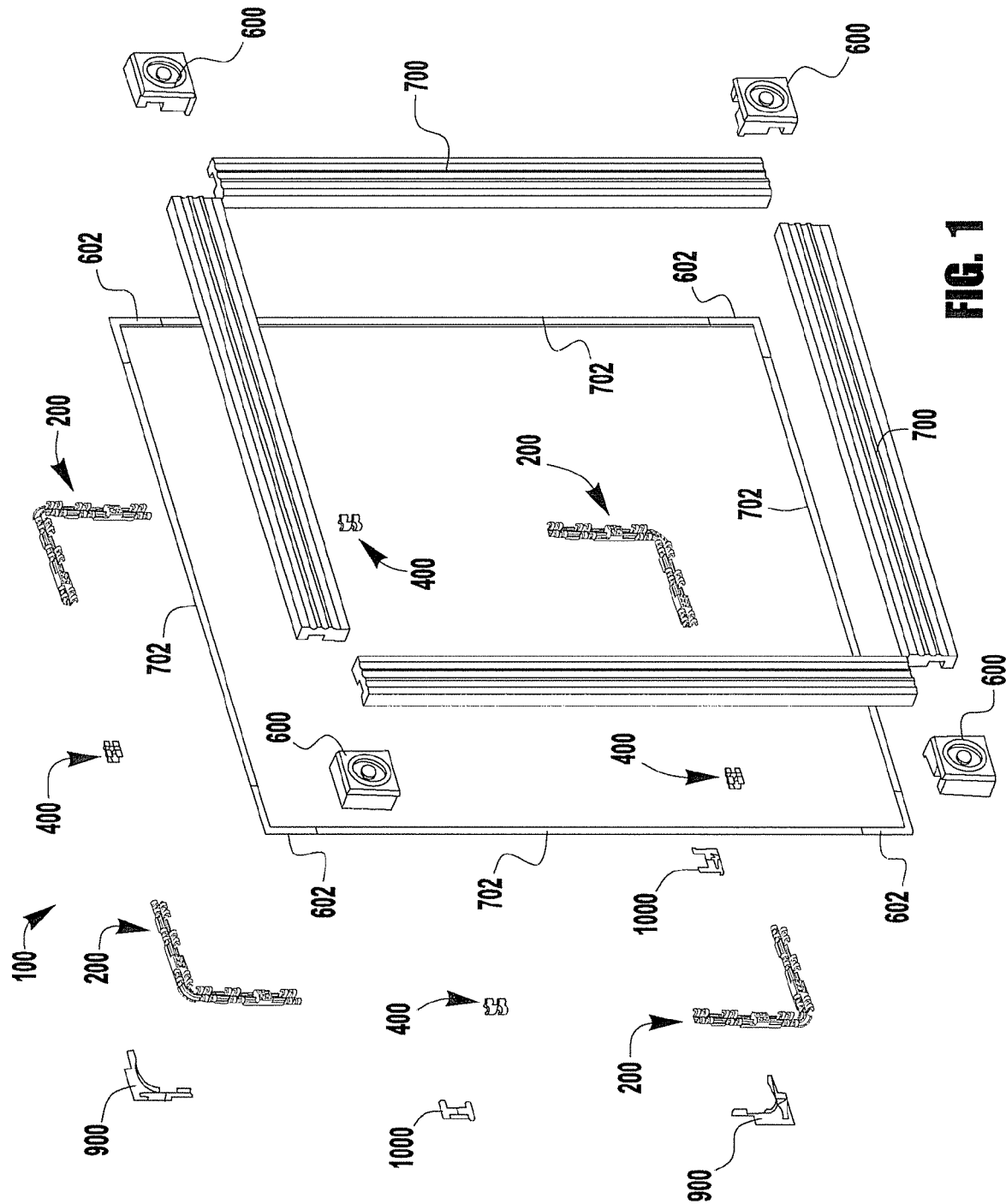
FIG. 1 is an exploded perspective view of a mirror frame mounting system, according to one exemplary embodiment.

While the general inventive concept is susceptible of embodiment in many different forms, there are shown in the drawings and will be described herein in detail specific embodiments thereof with the understanding that the present disclosure is to be considered as an exemplification of the principles of the general inventive concept. Accordingly, the general inventive concept is not intended to be limited to the specific embodiments illustrated herein.

Referring to FIG. 1, components of a mirror frame mounting system 100, in accordance with an exemplary embodiment, are illustrated. The components of the mirror frame mounting system 100 include corner bracket assemblies 200, side bracket assemblies 400, corner frame assemblies and side frame assemblies. The corner bracket assemblies 200 are affixed to the corners of a mirror (not shown) and interface with the corner frame assemblies to removably attach the corner frame assemblies to the mirror, as described below. Similarly, the side bracket assemblies 400 are affixed to the sides of the mirror and interface with the side frame assemblies to removably attach the side frame assemblies to the mirror, as described below.

In one exemplary embodiment, a corner template 900 is used to properly align each of the corner bracket assemblies 200 relative to the mirror and a side template 1000 is used to properly align each of the side bracket assemblies 400 relative to the mirror, as described below.

Figure 2:
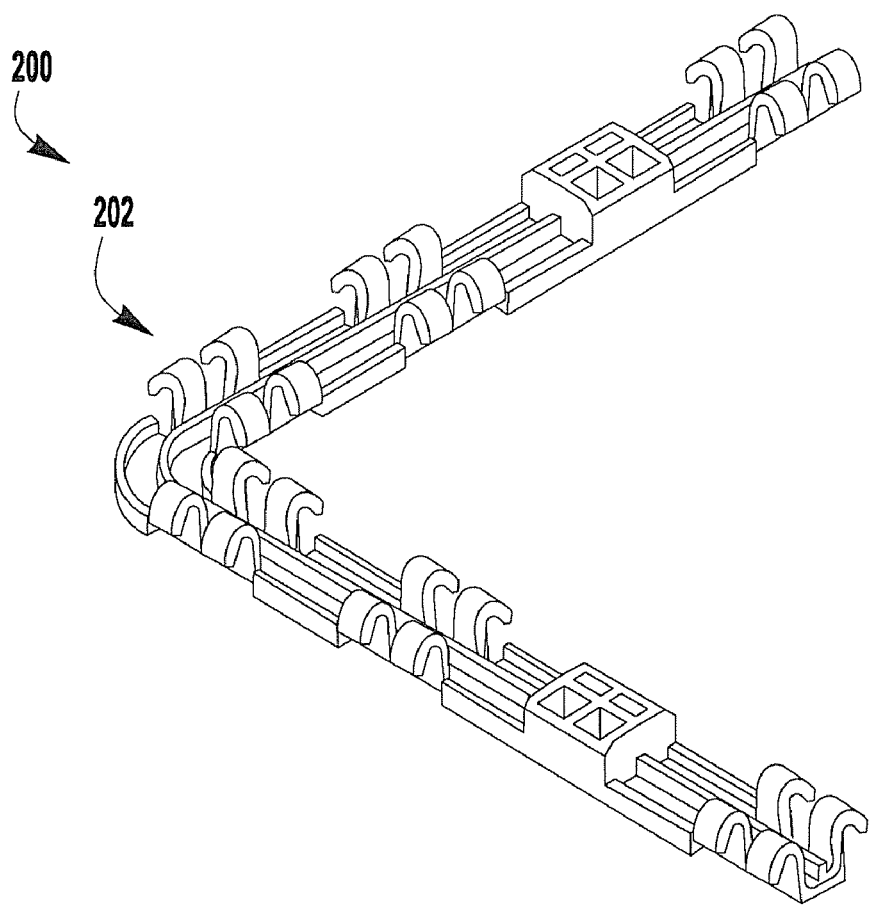
FIG. 2 is a perspective view of a corner bracket assembly, according to one exemplary embodiment, of the mirror frame mounting system shown in FIG. 1.
Figure 2:
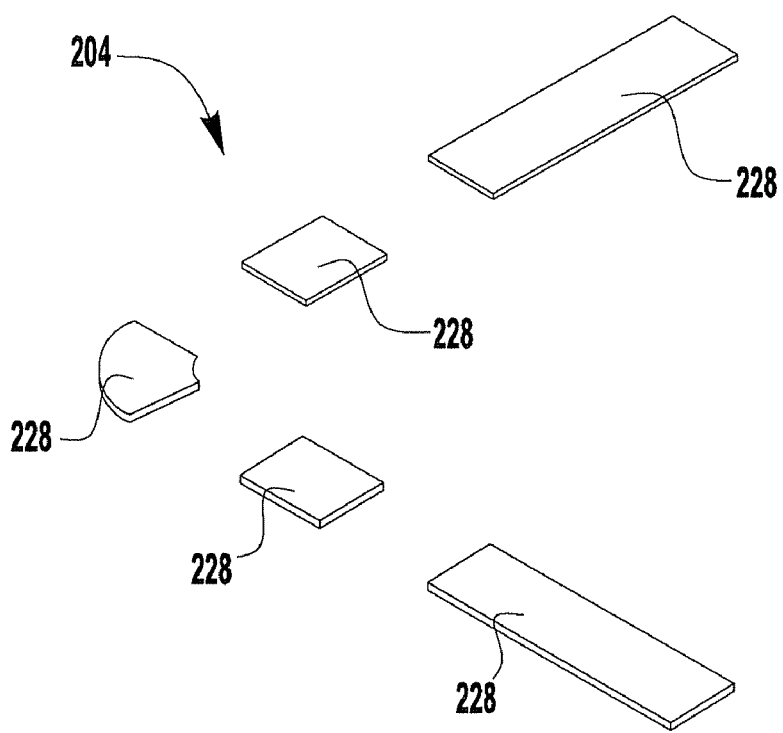
Figure 3A:
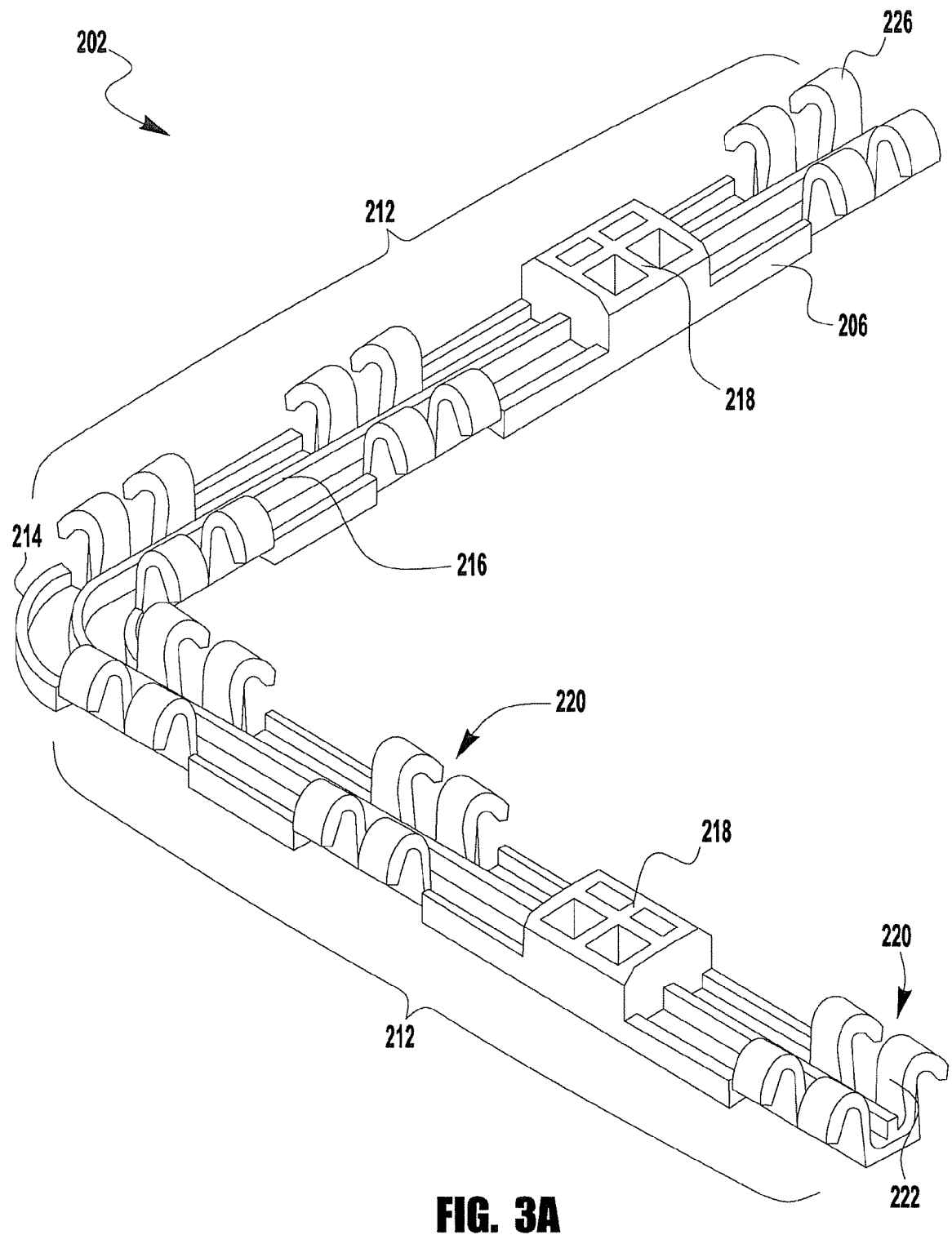
Figure 3B:
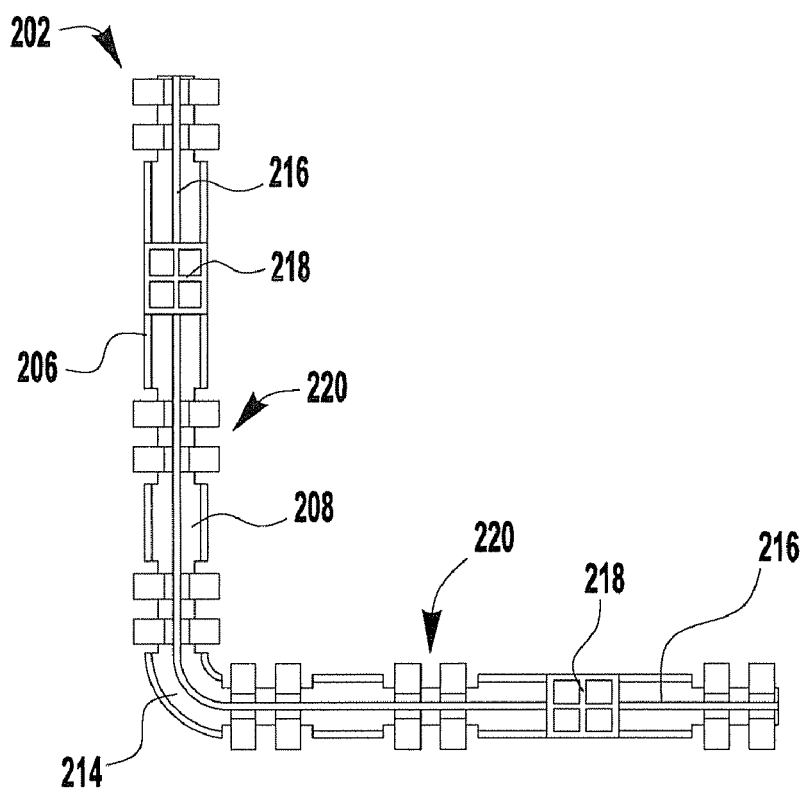
Figure 3C:
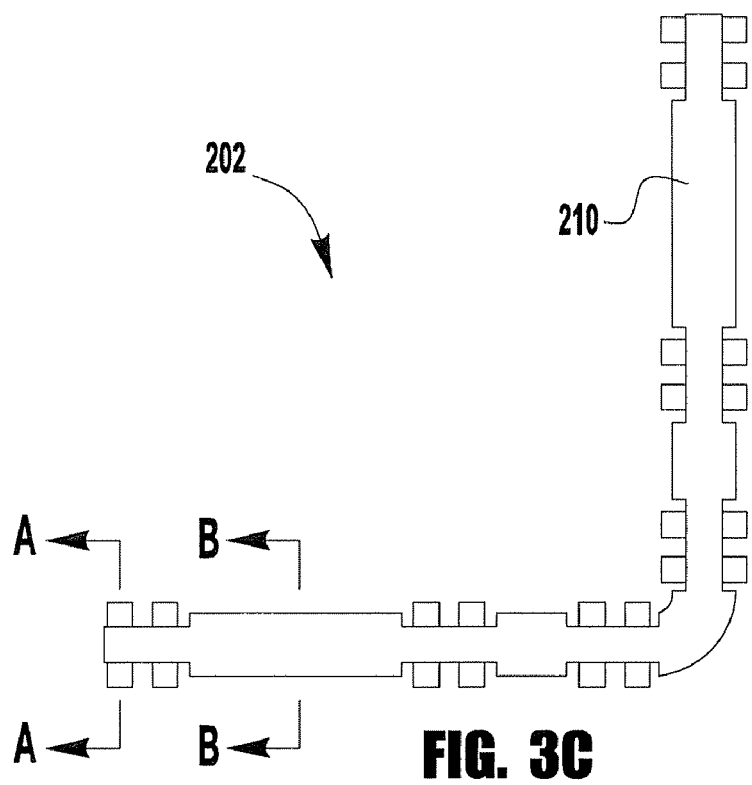

As shown in FIG. 2, the corner bracket assembly 200 includes a corner bracket 202 and a corner adhesive assembly 204.

The corner bracket 202 has a body 206 with an upper or front surface 208 and a lower or rear surface 210 (see FIGS. 3A-3F). The body 206 of the corner bracket 202 includes a pair of arms 212 that are generally perpendicular to one another. The arms 212 meet at a rounded corner 214 of the body 206. In one exemplary embodiment, at least one rib 216 is formed on the body 206. The rib 216 extends along the length of the body 206 to strengthen the body 206 (see FIG. 3B). The rib 216 can also act to reduce any undesired flexing of the arms 212 that may occur if the body 206 is thin. Other strengthening elements (e.g., a web 218) can be formed on the body 206.

Each of the arms 212 includes at least one fastener 220. In one exemplary embodiment, as shown in FIGS. 3A-3F, the corner bracket 202 includes six fasteners 220. Each fastener 220 includes at least one finger 222. In one exemplary embodiment, each fastener 220 includes a first pair of adjacent fingers 222 extending above the upper surface 208 along a first side of the body 206 and a second pair of adjacent fingers 222 extending above the upper surface 208 along a second side of the body 206. The first pair of adjacent fingers 222 is separated from the second pair of adjacent fingers 222 by a space 224 (see FIG. 3D). The space 224 allows the first pair of adjacent fingers 222 to flex toward the second pair of adjacent fingers 222 and vice versa. Each of the fingers 222 has a curved upper portion 226.

In one exemplary embodiment, the corner bracket 202 is made of plastic (e.g., ABS) and is formed through an injection molding process. One of ordinary skill in the art will appreciate that the corner bracket 202 can be made of any other suitable material and formed through any other suitable process.

The corner adhesive assembly 204 is used to affix the corner bracket 202 to the mirror. The corner adhesive assembly 204 includes at least one piece of double-sided adhesive tape 228. In one exemplary embodiment, as shown in FIG. 2, the corner adhesive assembly 204 includes five pieces of double-sided adhesive tape 228. The corner bracket assembly 200 is formed by adhering one side of the double-sided adhesive tape 228 to the corner bracket 202. By using the double-sided adhesive tape 228, no tools are required to install the corner brackets 202.

Figure 4:
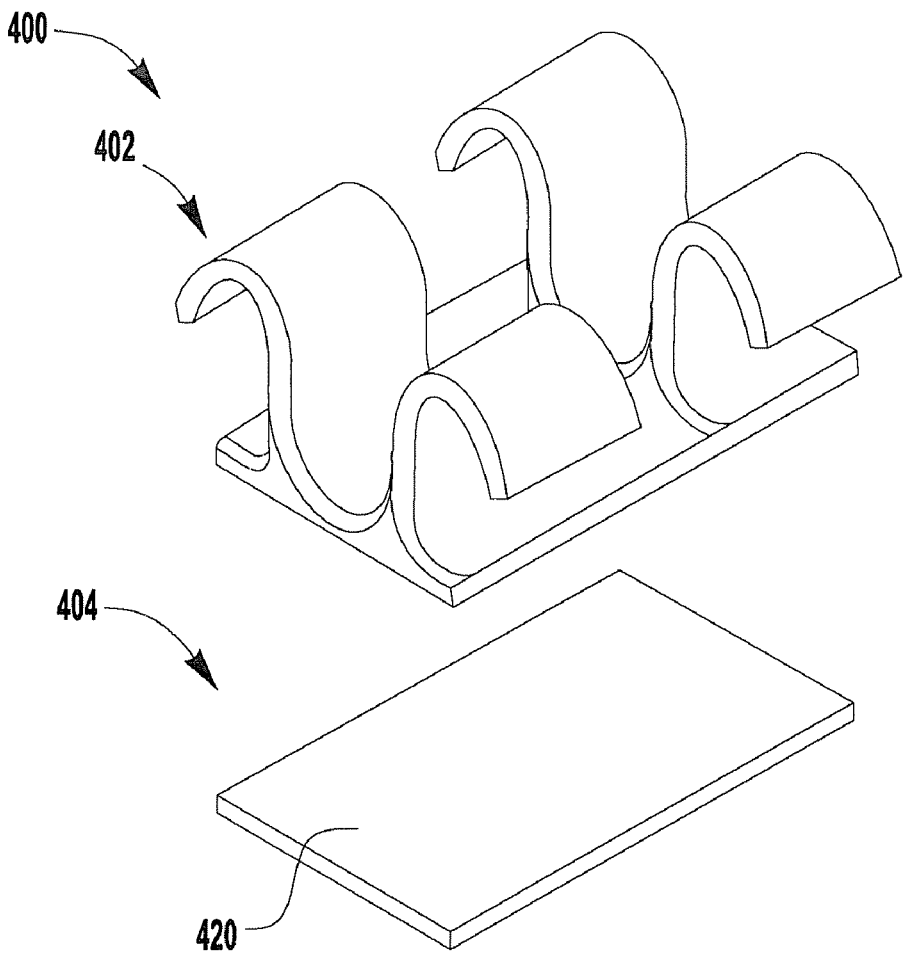
FIG. 4 is a perspective view of a side bracket assembly, according to one exemplary embodiment, of the mirror frame mounting system shown in FIG. 1.
Figure 5A:
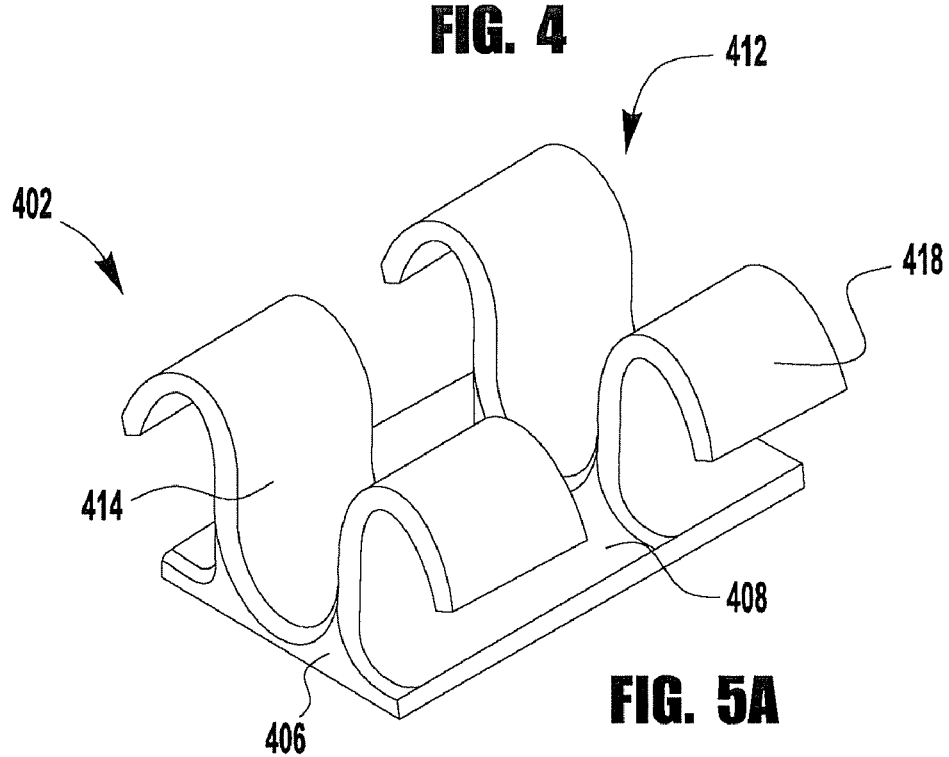
FIGS. 5A-5F show a side bracket, according to one exemplary embodiment, of the mirror frame mounting system of FIG. 1.
Figure 5B:
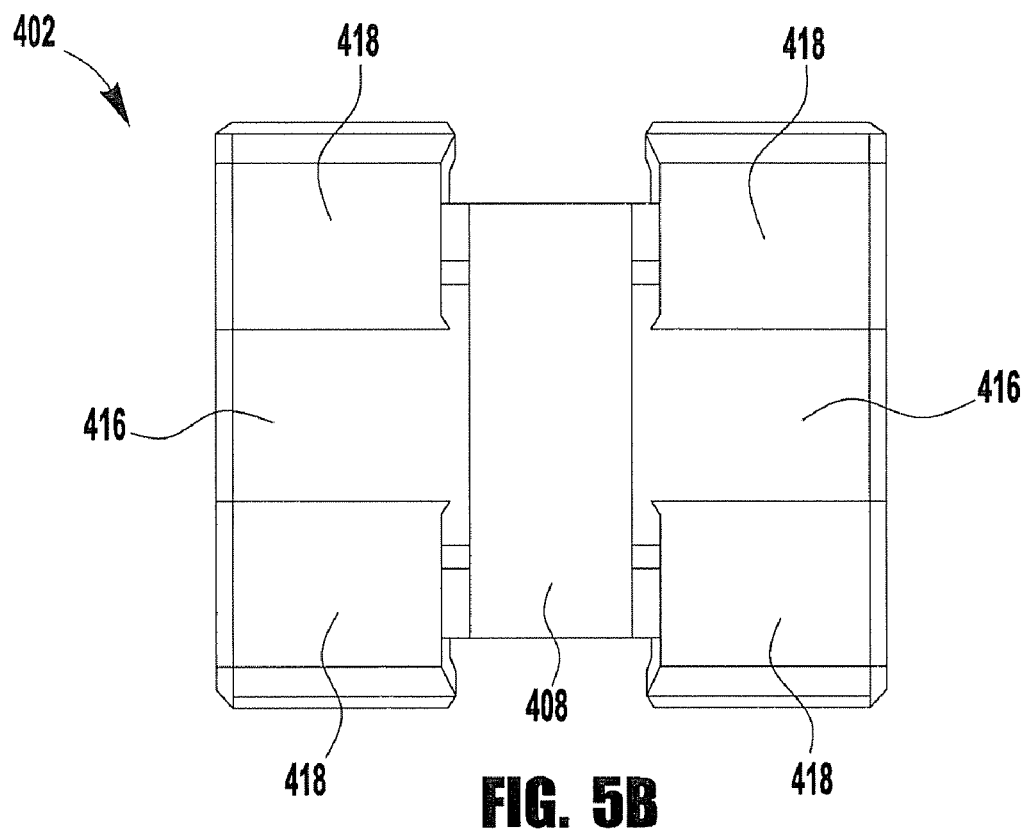
Figure 5C:
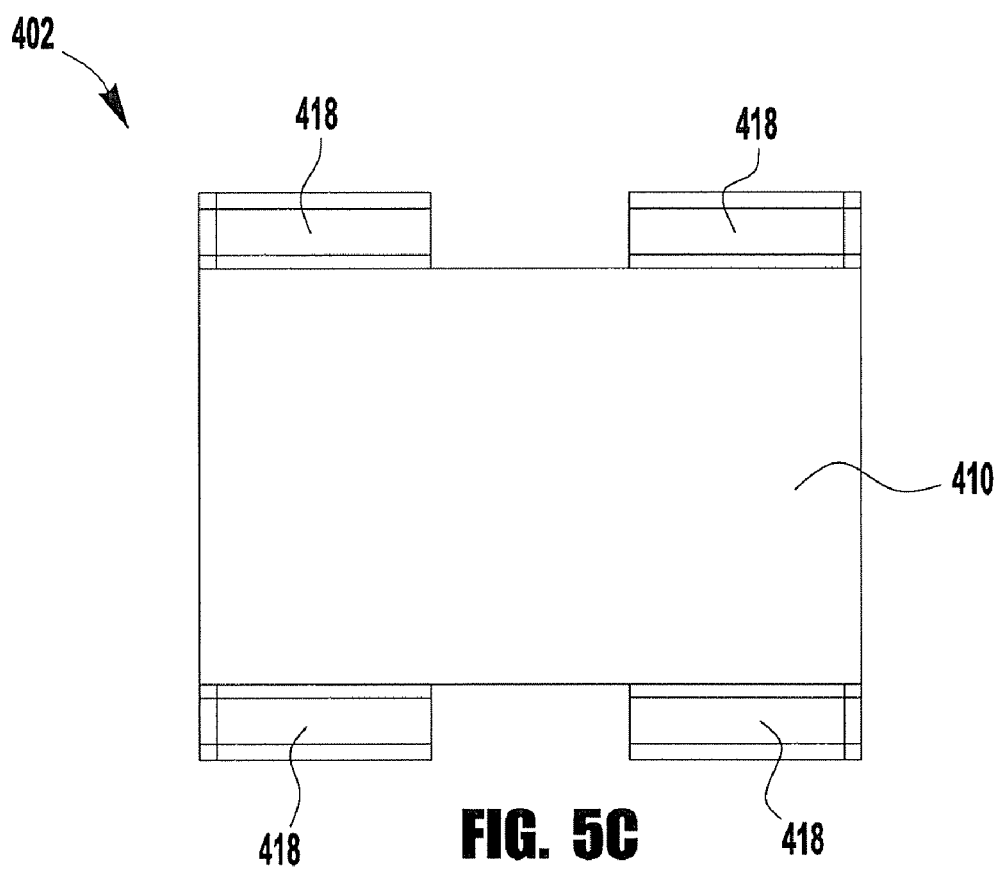
Figure 5D:
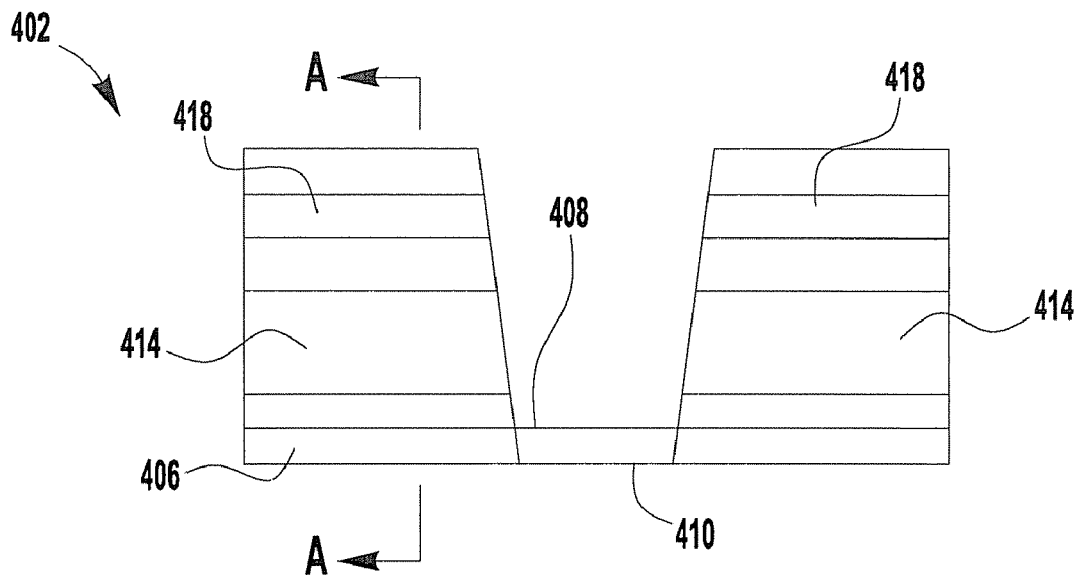
Figure 5E:
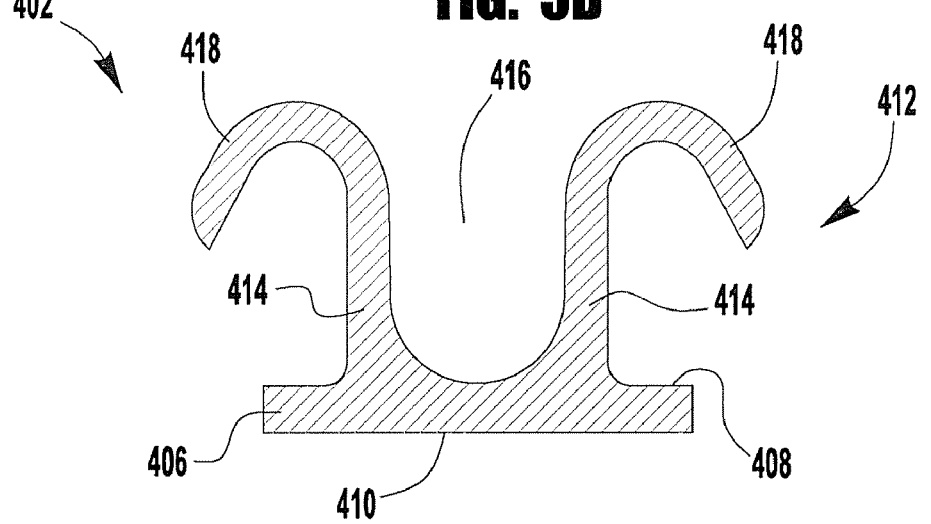
Figure 5F:
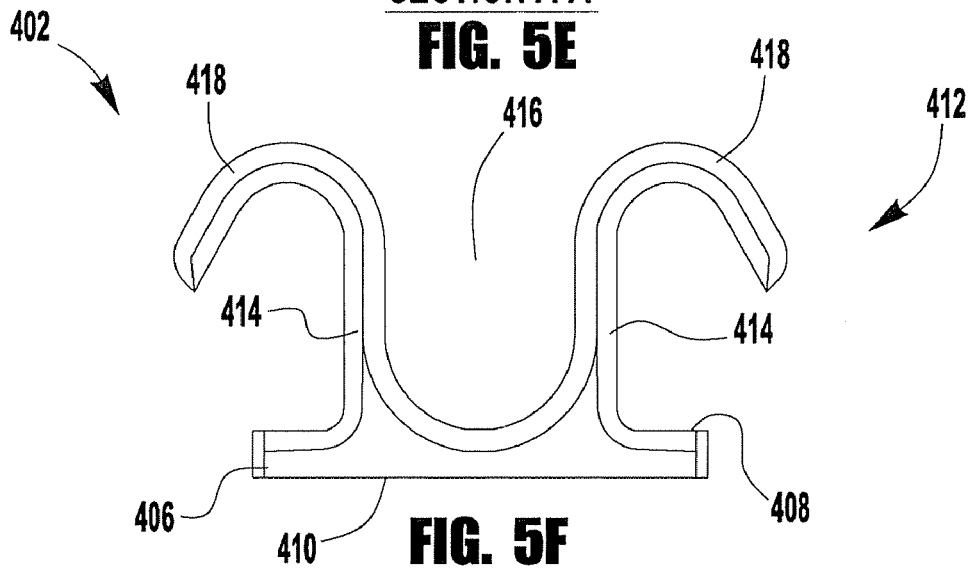

As shown in FIG. 4, the side bracket assembly 400 includes a side bracket 402 and a side adhesive assembly 404.

The side bracket 402 has a body 406 with an upper or front surface 408 and a lower or rear surface 410 (see FIGS. 5A-5F). The body 406 of the side bracket 402 includes at least one fastener 412. In one exemplary embodiment, as shown in FIGS. 5A-5F, the side bracket 402 includes one fastener 412. Each fastener 412 includes at least one finger 414. In one exemplary embodiment, each fastener 412 includes a first pair of adjacent fingers 414 extending above the upper surface 408 along a first side of the body 406 and a second pair of adjacent fingers 414 extending above the upper surface 408 along a second side of the body 406. The first pair of adjacent fingers 414 is separated from the second pair of adjacent fingers 414 by a space 416 (see FIGS. 5B, 5E-5F). The space 416 allows the first pair of adjacent fingers 414 to flex toward the second pair of adjacent fingers 414 and vice versa. Each of the fingers 414 has a curved upper portion 418.

In one exemplary embodiment, the side bracket 402 is made of plastic (e.g., ABS) and is formed through an injection molding process. One of ordinary skill in the art will appreciate that the side bracket 402 can be made of any other suitable material and formed through any other suitable process.

The side adhesive assembly 404 is used to affix the side bracket 402 to the mirror. The side adhesive assembly 404 includes at least one piece of double-sided adhesive tape 420. In one exemplary embodiment, as shown in FIG. 4, the side adhesive assembly 404 includes one piece of double-sided adhesive tape 420. The side bracket assembly 400 is formed by adhering one side of the double-sided adhesive tape 420 to the side bracket 402. By using the double-sided adhesive tape 420, no tools are required to install the side brackets 402.

The corner frame assembly includes a corner frame 600 (see FIGS. 6A-6E) and a corner foam 602 (see FIG. 1).

Figure 6A:
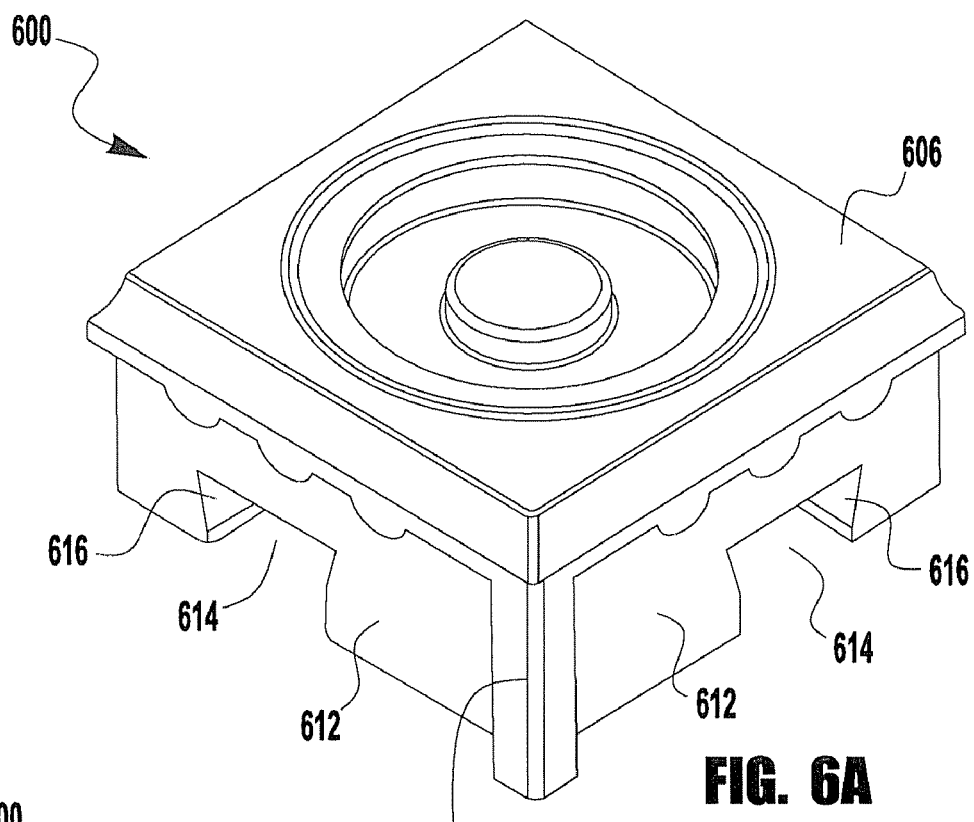
FIGS. 6A-6E show a corner frame, according to one exemplary embodiment, of the mirror frame mounting system of FIG. 1.
Figure 6B:
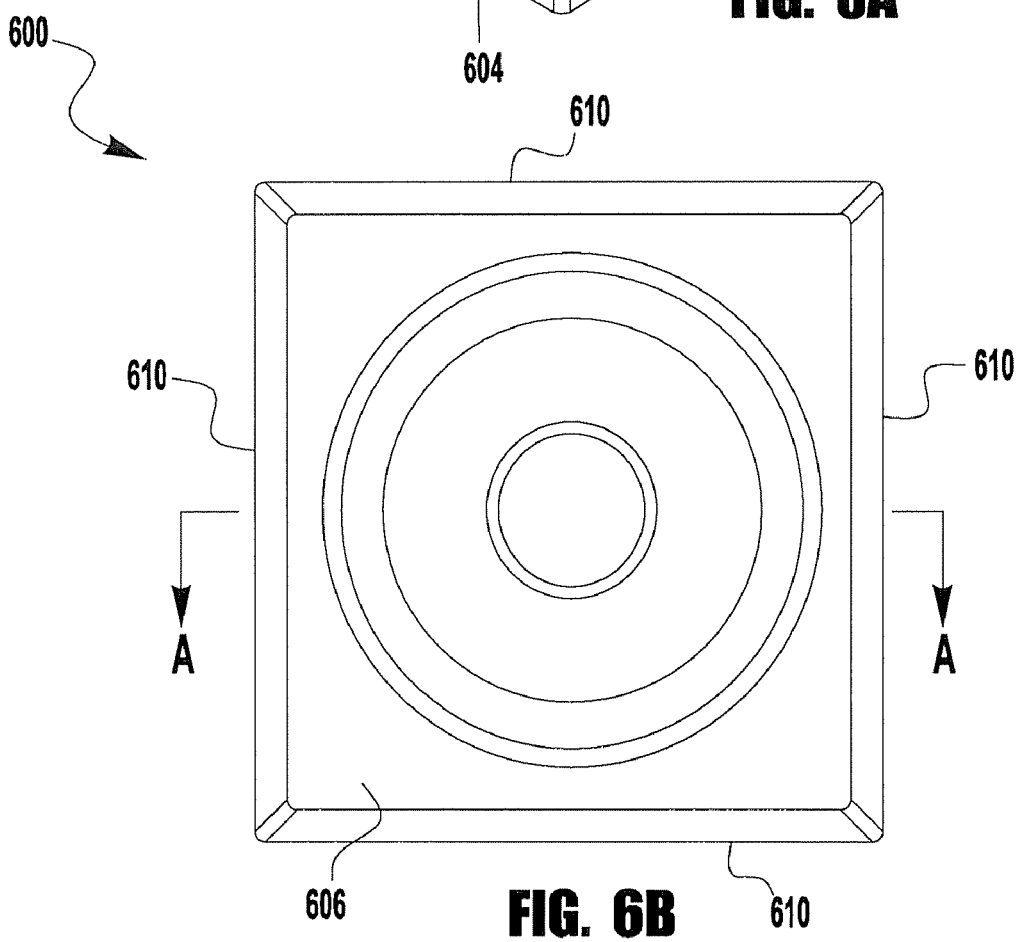
Figure 6C:
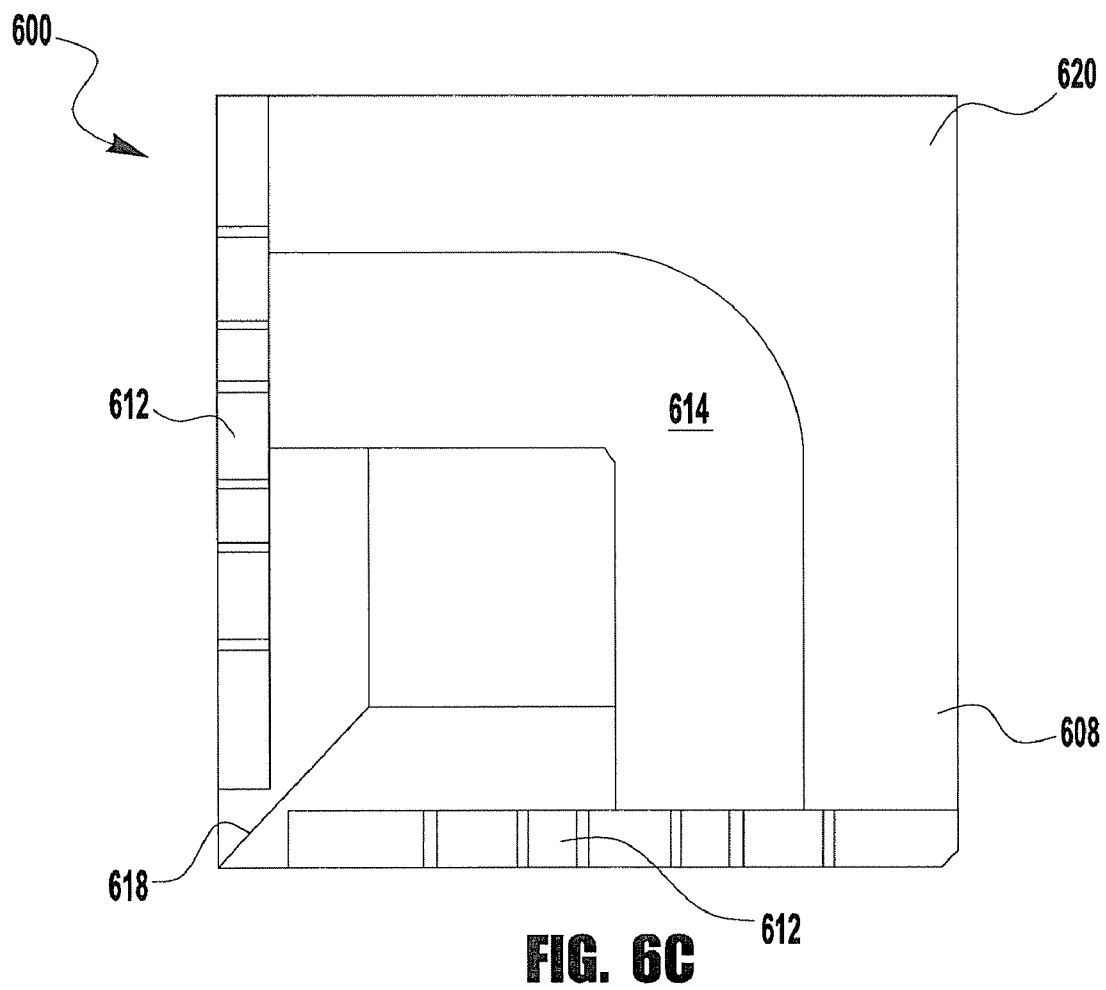
Figure 6D:
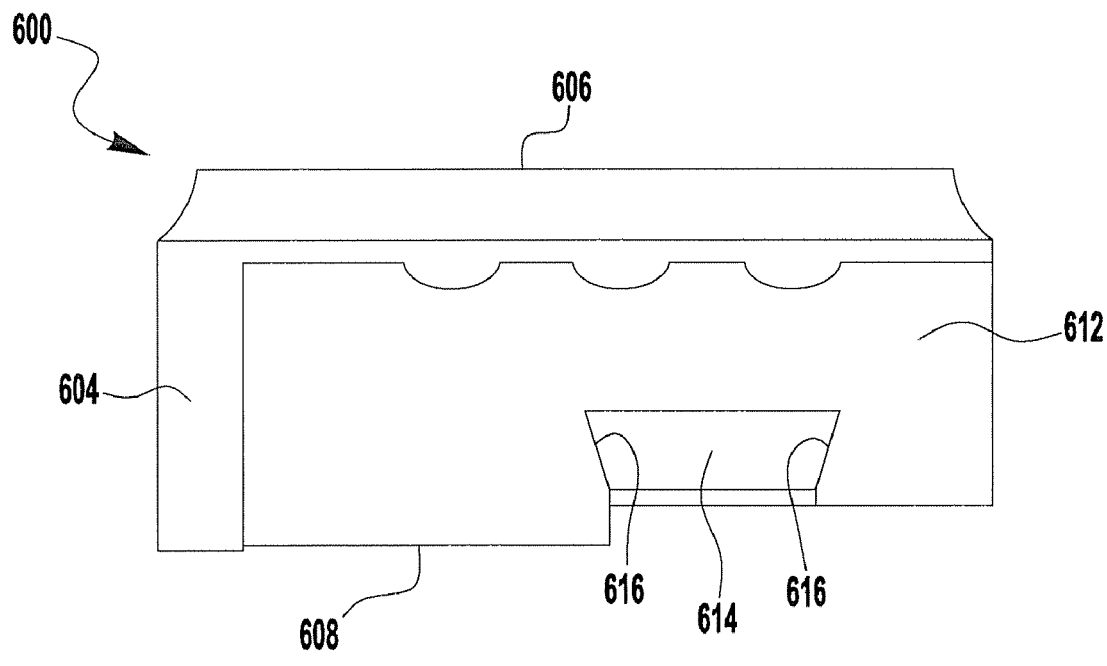
Figure 6E:
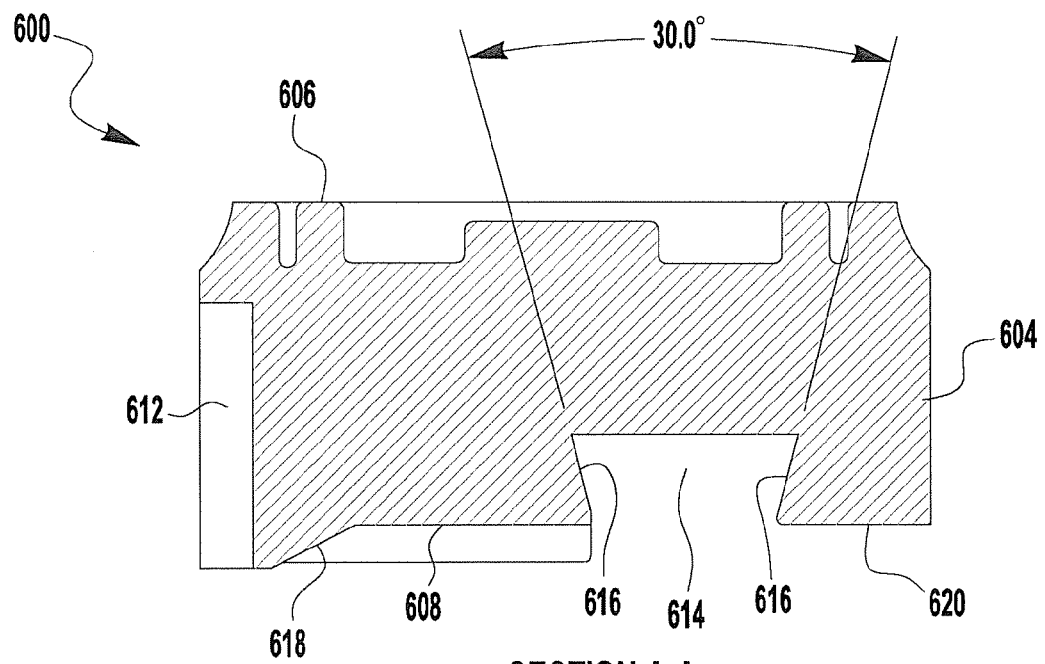
Figure 7A:
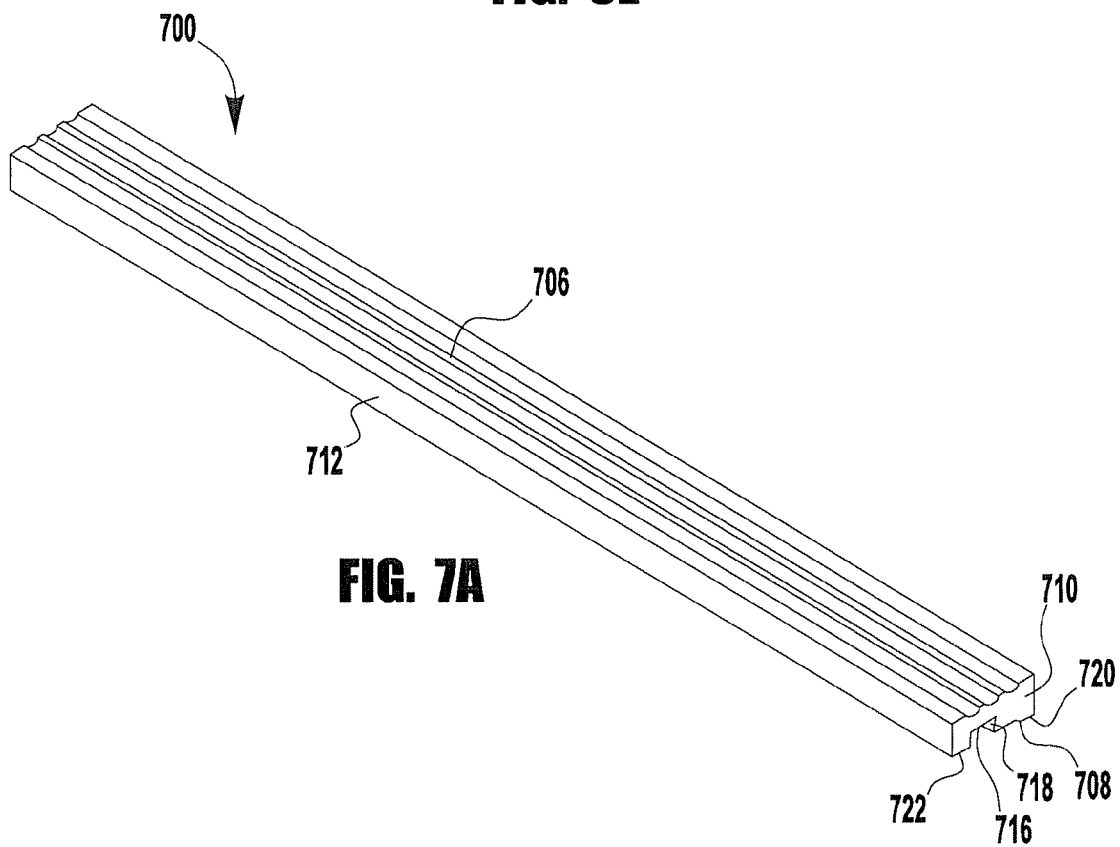
FIGS. 7A-7D show a side frame, according to one exemplary embodiment, of the mirror frame mounting system of FIG. 1.
Figure 7B:
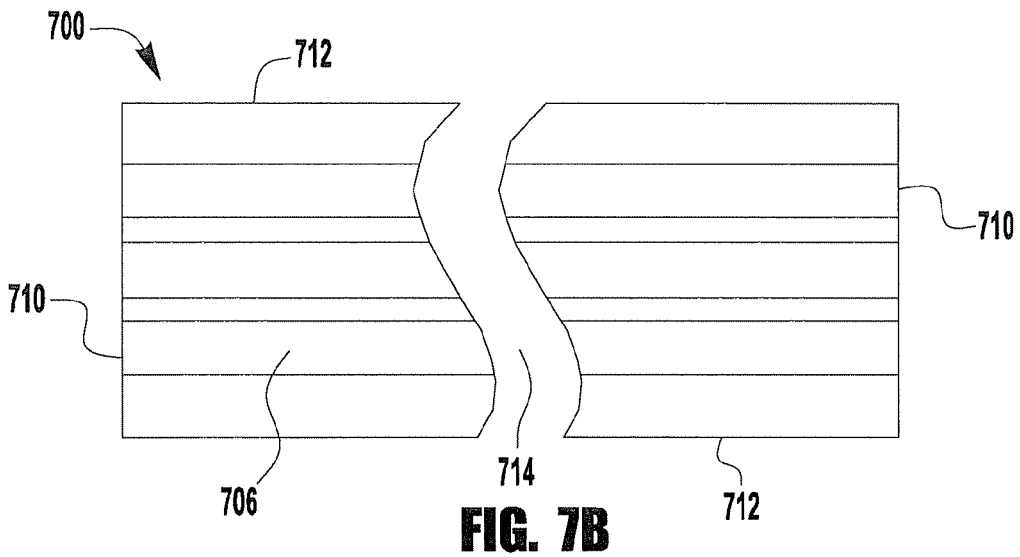
Figure 7C:
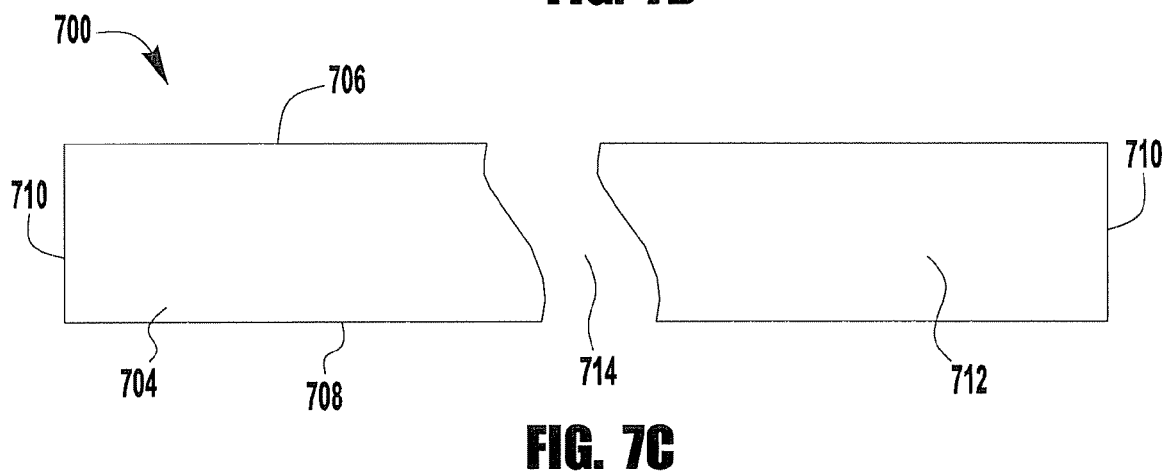
Figure 7D:
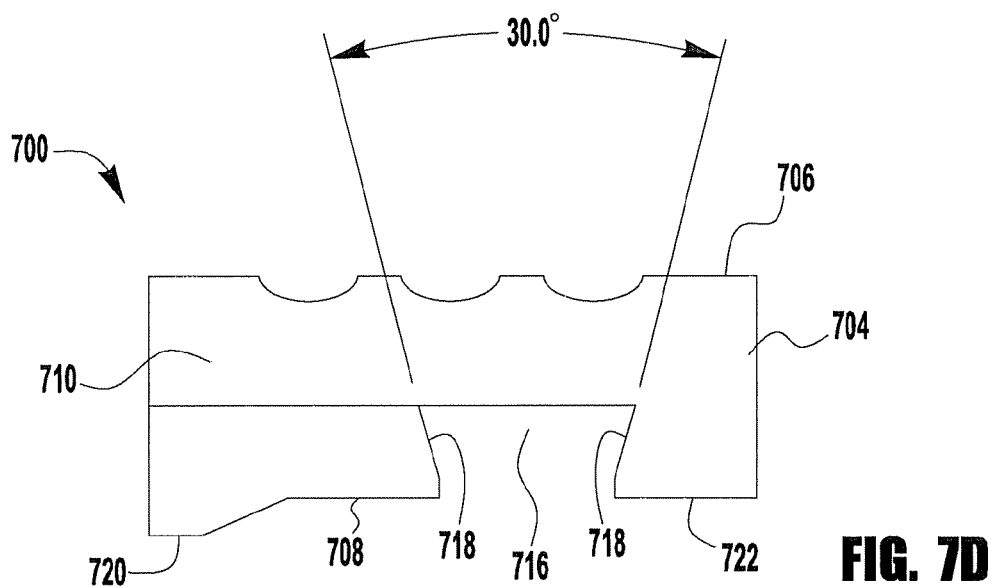

The corner frame 600 has a body 604 with an upper or front surface 606 and a lower or rear surface 608. The body 604 of the corner frame 600 has a generally square shape with four sides 610 (see FIG. 6B). Two of the sides 610 are adjacent to one another and include a recess 612. The other two sides 610 are adjacent to one another and lack the recess 612. A groove 614 extends through the body 604 of the corner frame 600. In one exemplary embodiment, as shown in FIGS. 6C-6D, the groove 614 bends at 90 degrees to correspond to the two sides 610 that lack the recess 612. Ends of the groove 614 terminate at the sides 610 with the recesses 612.

A width of the groove 614 is wider near the upper surface 606 of the body 604 than near the lower surface 608 of the body 604, such that walls 616 of the groove 614 have a predefined slope. In one exemplary embodiment, an opposing pair of the walls 616 forms an angle of 30 degrees relative to one another (see FIG. 6E). The groove 614 of the corner frame 600 is operable to interface with the fasteners 220 of the corner bracket 202 to connect the corner frame 600 to the corner bracket 202, as described below. The lower surface 608 of the body 604 of the corner frame 600 includes a lip portion 618 and an outer portion 620 with the groove 614 located between the lip portion 618 and the outer portion 620 (see FIGS. 6C and 6E).

In one exemplary embodiment, the corner frame 600 is made of wood or woods based board (e.g., MDF). One of ordinary skill in the art will appreciate that the corner frame 600 can be made of any other suitable material. The wood may be shaped, as known in the art, to have a desired decorative appearance. The wood may be treated, such as through application of a paint, laminate, stain, etc. Various foils may be applied to the wood to give the corner frame 600 a metallic appearance.

The corner foam 602 is shown in FIG. 1. In one exemplary embodiment, as shown in FIG. 1, the corner foam 602 includes one continuous piece of foam having a 90 degree angle and having a shape and length that generally corresponds to a shape and length of the corner frame 600. One of ordinary skill in the art will appreciate that the corner foam 602 can comprise more than one piece of foam. The corner frame assembly is formed by attaching one side of the corner foam 602 to the lower surface 608 of the corner frame 600. In particular, the corner foam 602 is attached to the outer portion 620 of the lower surface 608 of the body 604. In one exemplary embodiment, an adhesive is used to attach the corner foam 602 to the corner frame 600. In addition to, or instead of, the adhesive, staples can be used to attach the corner foam 602 to the corner frame 600.

The side frame assembly includes a side frame 700 (see FIGS. 7A-7D) and a side foam 702 (see FIG. 1).

The side frame 700 has a body 704 with an upper or front surface 706 and a lower or rear surface 708. The body 704 of the side frame 700 has a generally rectangular shape with two substantially parallel short sides 710 and two substantially parallel long sides 712 (see FIG. 7B). The short sides 710 of the body 704 have a profile that corresponds to a profile of the recesses 612 in the corner frame 600. The long sides 712 of the body 704 of the side frame 700 can have various lengths, which is represented by the gaps 714 in FIGS. 7B and 7C.

A groove 716 extends through the body 704 of the side frame 700. In one exemplary embodiment, the groove 716 is generally straight and extends the length of the long sides 712 of the body 704 with ends that terminate at the short sides 710 of the body 704. A width of the groove 716 is wider near the upper surface 706 of the body 704 than near the lower surface 708 of the body 704, such that walls 718 of the groove 716 have a predefined slope. In one exemplary embodiment, an opposing pair of the walls 718 forms an angle of 30 degrees relative to one another (see FIG. 7D). The groove 716 of the side frame 700 is operable to interface with the fasteners 412 of the side bracket 402 to connect the side frame 700 to the side bracket 402, as described below. The lower surface 708 of the body 704 of the side frame 700 includes a lip portion 720 and an outer portion 722 with the groove 716 located between the lip portion 720 and the outer portion 722 (see FIG. 7D).

In one exemplary embodiment, the side frame 700 is made of wood or wood-based board (e.g., MDF). One of ordinary skill in the art will appreciate that the side frame 700 can be made of any other suitable material. The wood may be shaped, as known in the art, to have a desired decorative appearance. The wood may be treated, such as through application of a paint, laminate, stain, etc. Various foils may be applied to the wood to give the side frame 700 a metallic appearance.

The side foam 702 is shown in FIG. 1. In one exemplary embodiment, as shown in FIG. 1, the side foam 702 includes one continuous piece of foam having a length that generally corresponds to a length of the side frame 700. One of ordinary skill in the art will appreciate that the side foam 702 can comprise more than one piece of foam. The side frame assembly is formed by attaching one side of the side foam 702 to the lower surface 708 of the side frame 700. In particular, the side foam 702 is attached to the outer portion 722 of the lower surface 708 of the body 704. In one exemplary embodiment, an adhesive is used to attach the side foam 702 to the side frame 700. In addition to, or instead of, the adhesive, staples can be used to attach the side foam 702 to the side frame 700.

Because mirrors come in a variety of sizes, it is not practical to make side frames 700 sized to fit the various mirror sizes. Instead, according to one exemplary embodiment, the side frames 700 come in a variety of standard lengths (e.g., 4 foot, 6 foot, 8 foot) that can be modified to a desired length. For example, if a mirror has a side that requires a side frame 700 with a 10 foot length, two evenly sized side frames 700, each having a 5 foot length (i.e., 10 foot/2), could be used. Thus, the 6 foot (or 8 foot) standard length side frames 700 can be cut down to the 5 foot lengths.

In one exemplary embodiment, a side joint assembly is placed between each pair of adjacent pair of side frames 700 to conceal the mating ends of the side frames 700, as described below. If the side joint assembly is used, a length of the side joint assembly should be taken into account when determining the length of the side frames 700.

The side joint assembly includes a side joint frame 800 (see FIGS. 8A-8E) and a side joint foam (not shown).

Figure 8A:
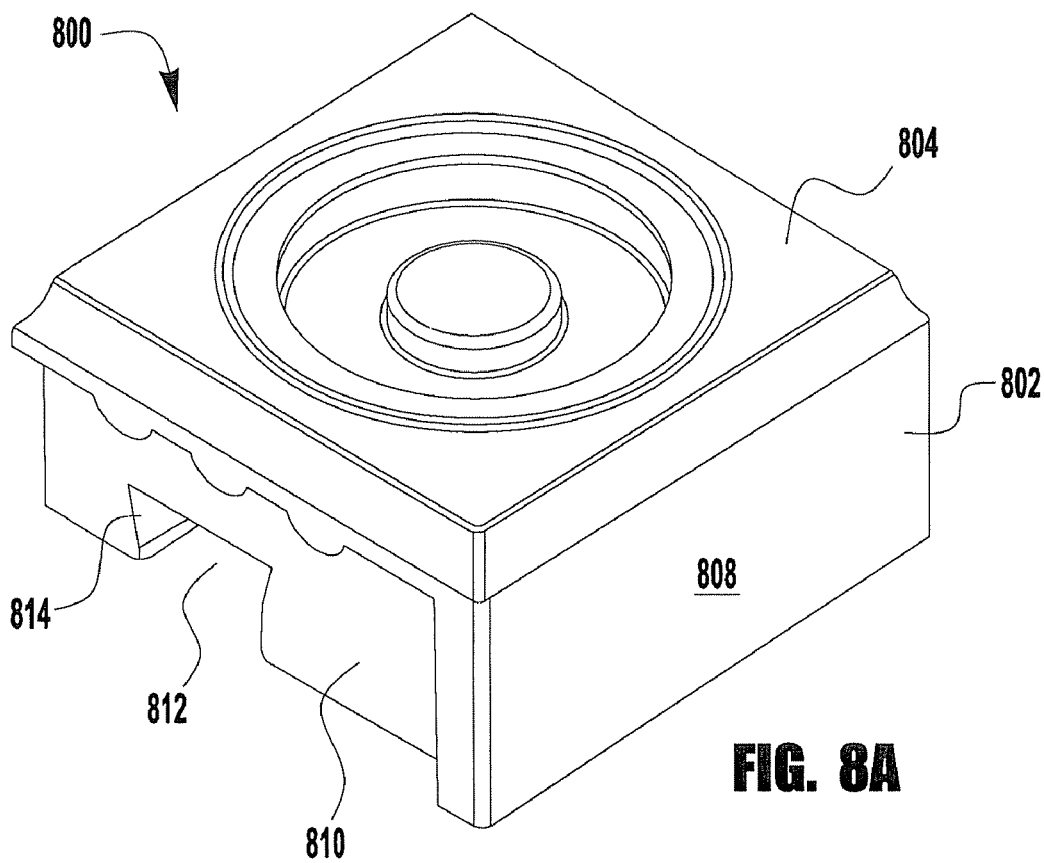
FIGS. 8A-8E show a side joint frame, according to one exemplary embodiment, of the mirror frame mounting system of FIG. 1.
Figure 8B:
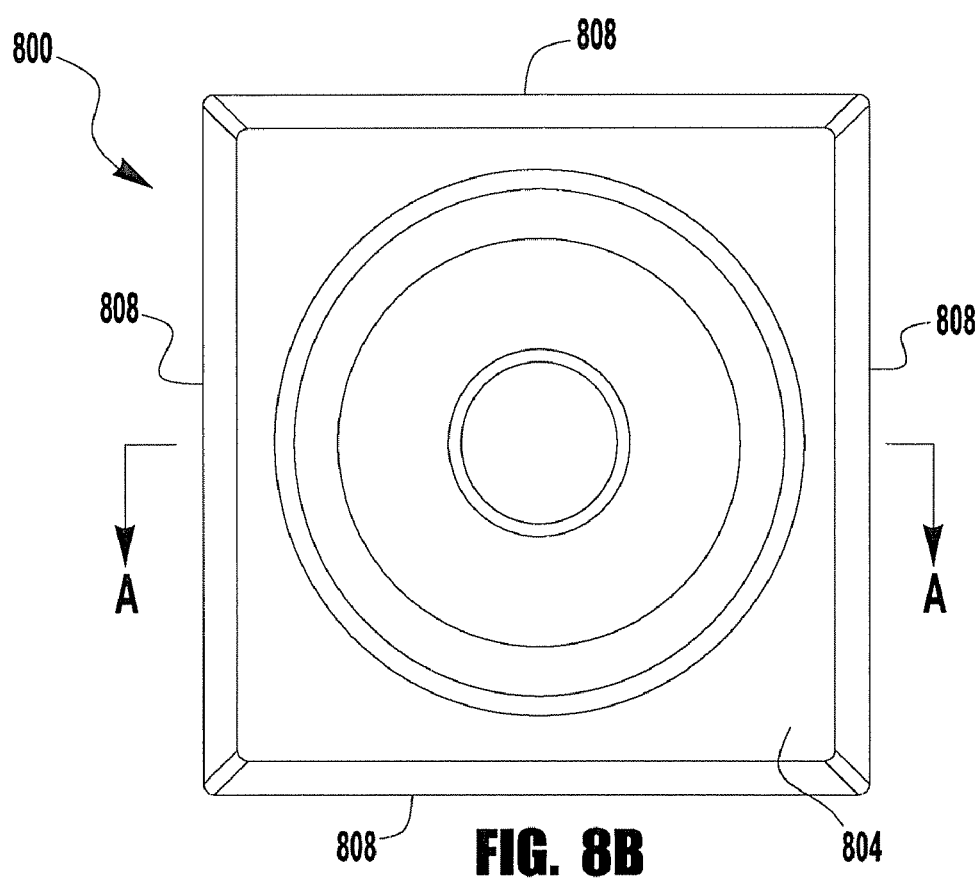
Figure 8C:
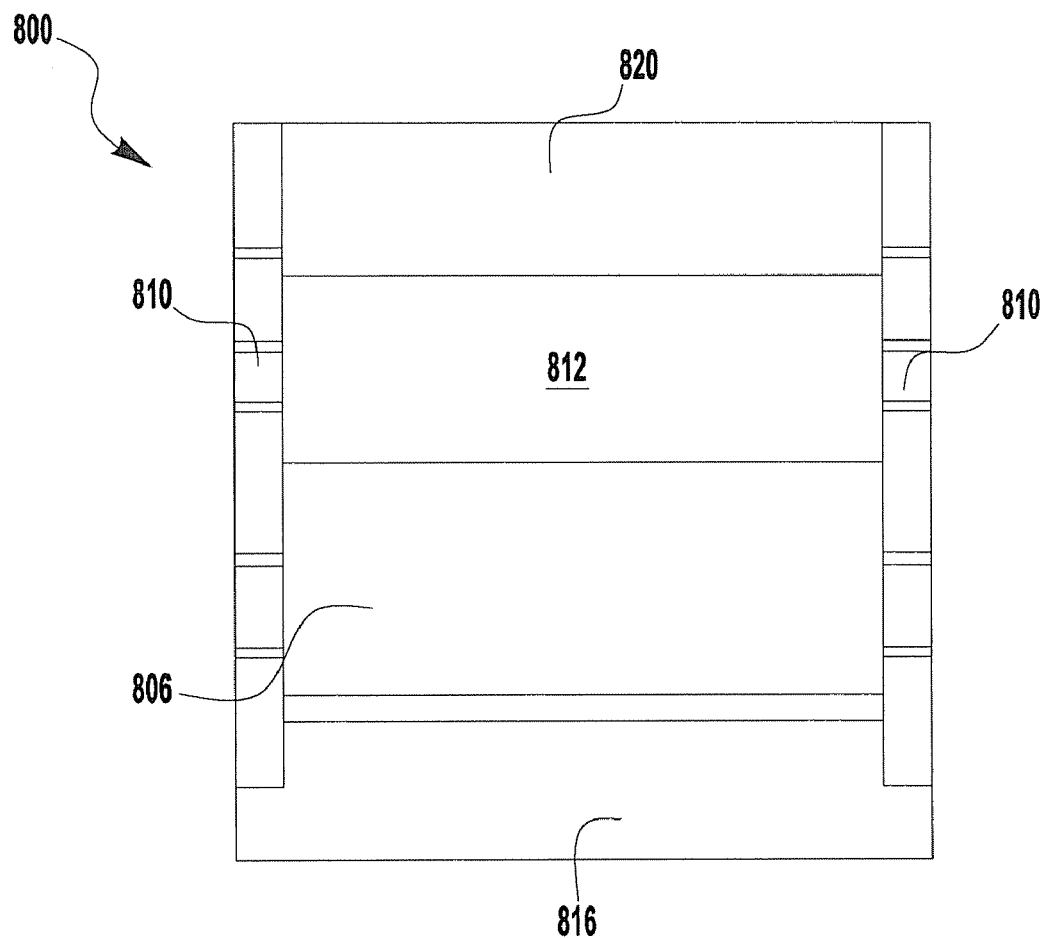
Figure 8D:
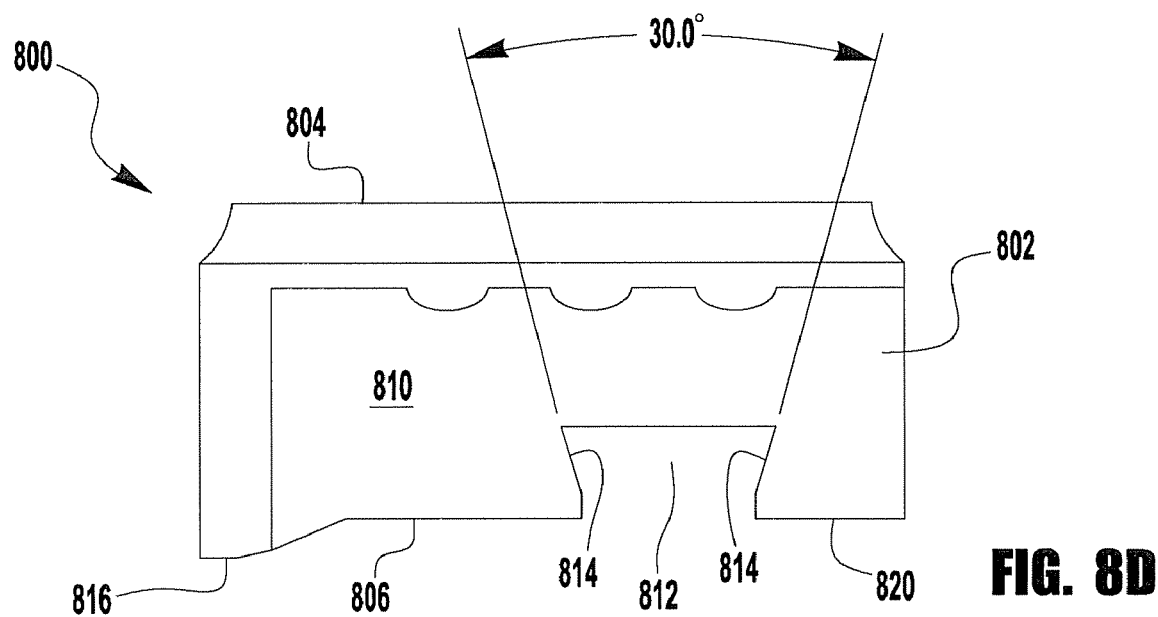
Figure 8E:
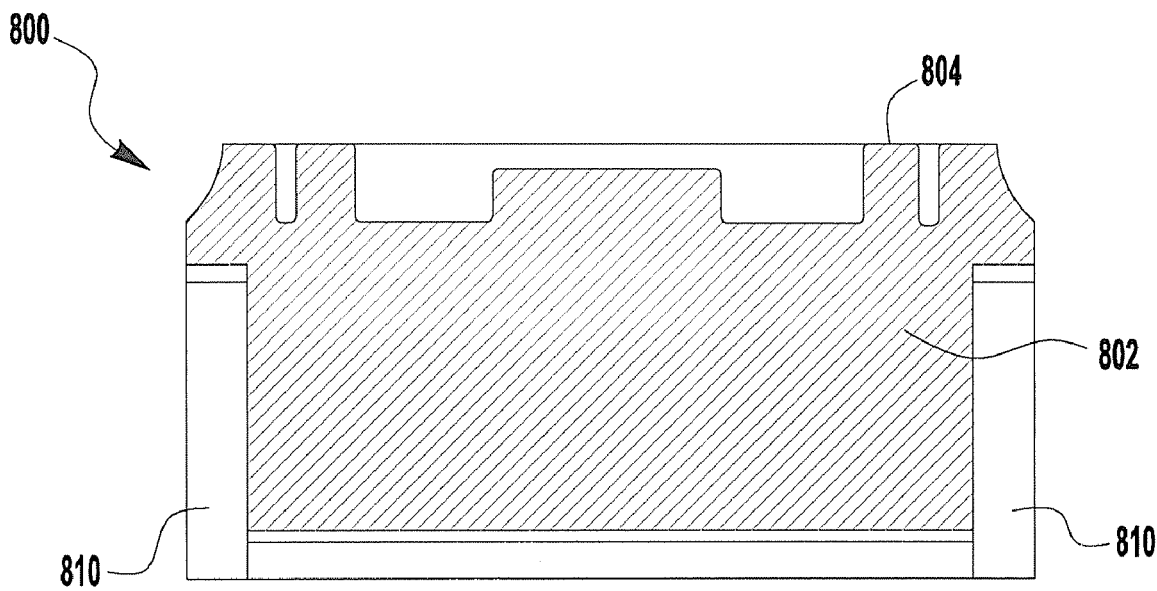
Figure 9A:
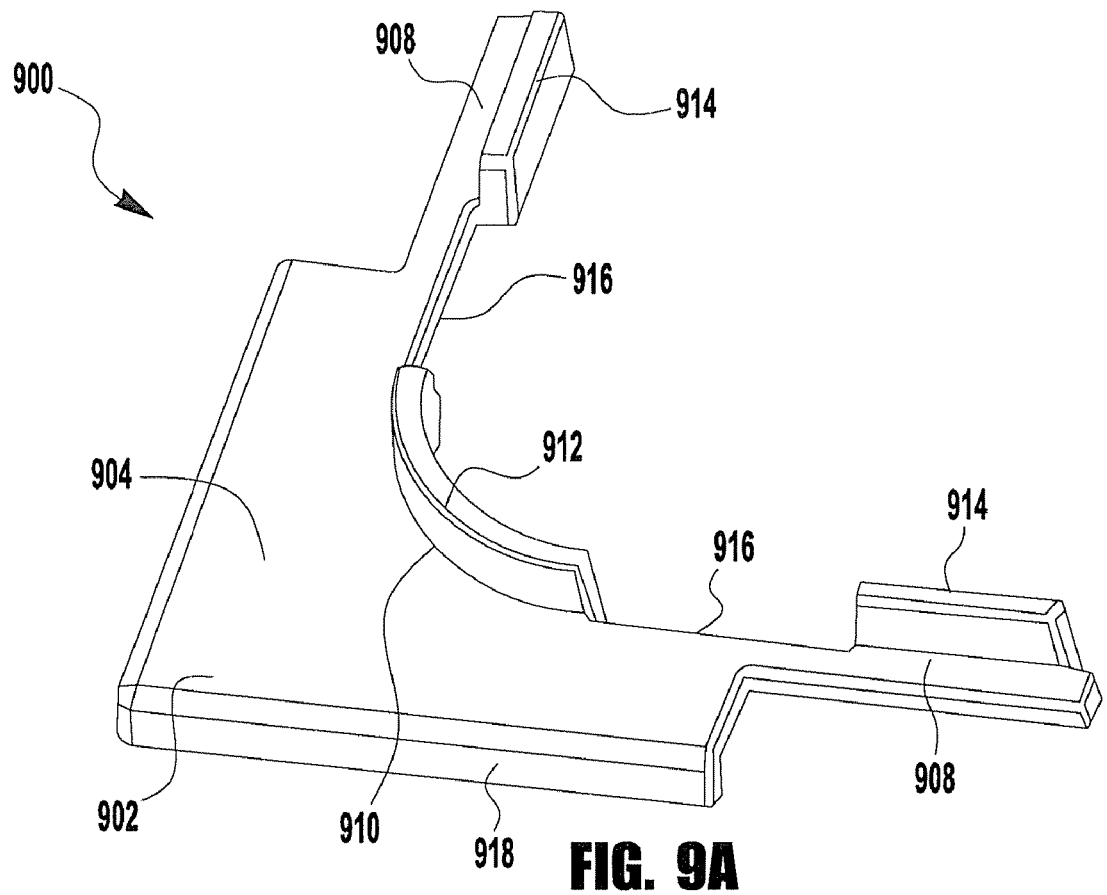
FIGS. 9A-9D show a corner template, according to one exemplary embodiment, of the exemplary mirror frame mounting system of FIG. 1.
Figure 9B:
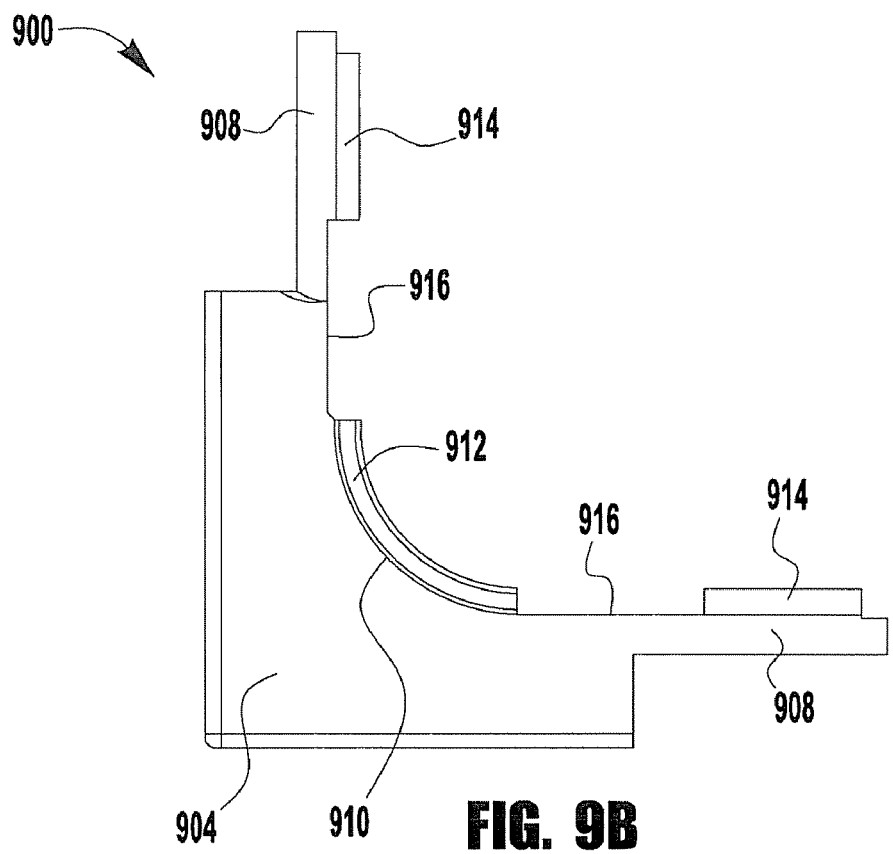
Figure 9C:
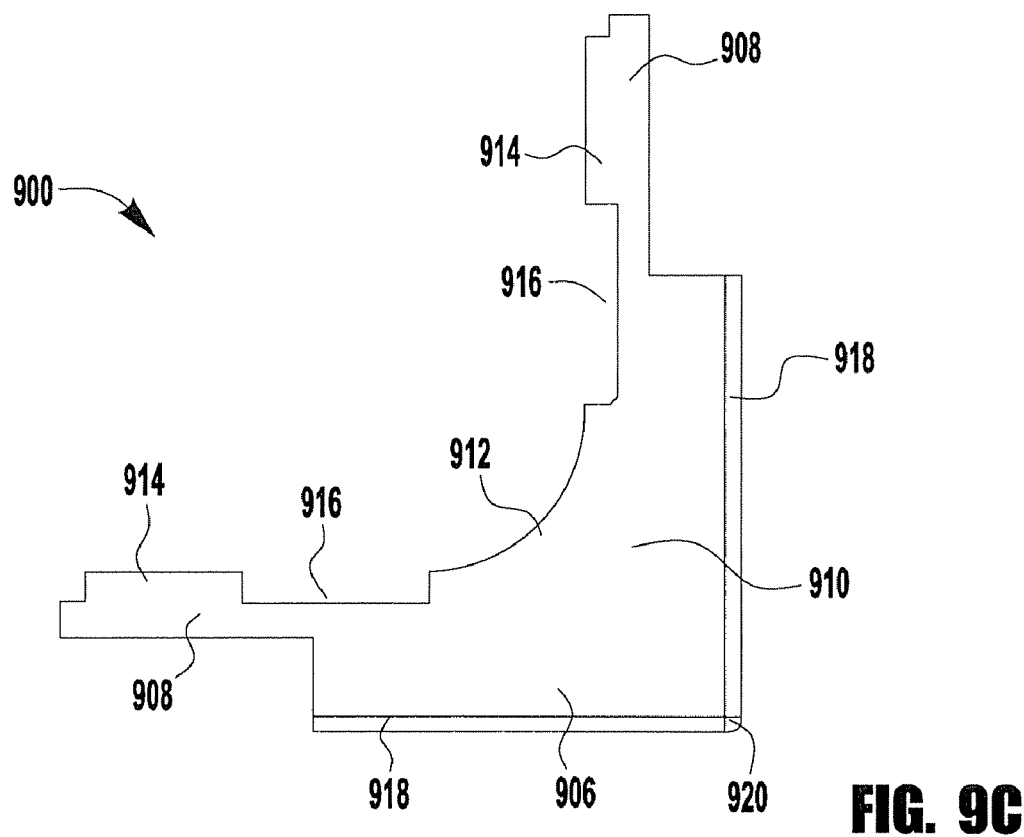
Figure 9D:
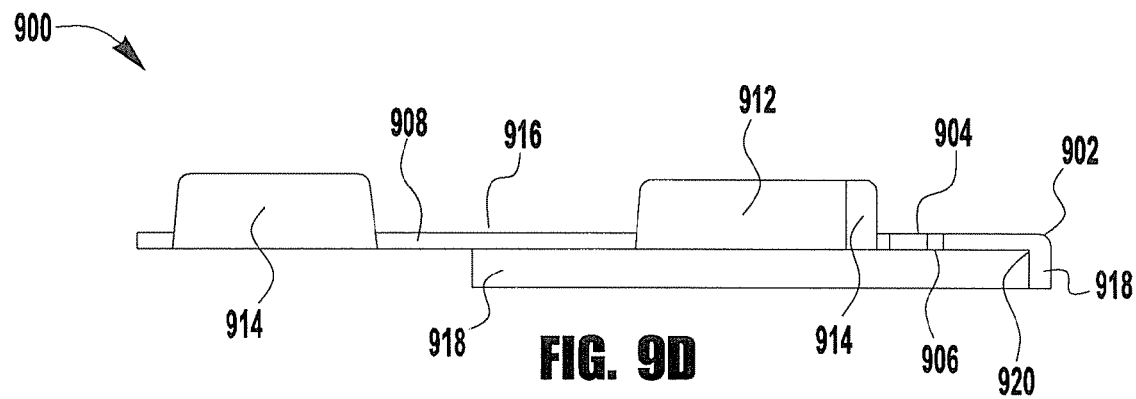

The side joint frame 800 has a body 802 with an upper or front surface 804 and a lower or rear surface 806. The body 802 of the side joint frame 800 has a generally square shape with four sides 808 (see FIG. 8B). Two of the sides 808 are opposed to one another and include a recess 810. The other two sides 808 are opposed to one another and lack the recess 810. A groove 812 extends through the body 802 of the side joint frame 800. In one exemplary embodiment, as shown in FIGS. 8C-8D, the groove 812 is generally straight and has ends that terminate at the sides 808 with the recesses 810.

A width of the groove 812 is wider near the upper surface 804 of the body 802 than near the lower surface 806 of the body 802, such that walls 814 of the groove 812 have a predefined slope. In one exemplary embodiment, an opposing pair of the walls 814 forms an angle of 30 degrees relative to one another (see FIG. 8D). The groove 812 of the side joint frame 800 is operable to interface with the fasteners 412 of the side bracket 402 to connect the side joint frame 800 to the side bracket 402, as described below. The lower surface 806 of the body 802 of the side joint frame 800 includes a lip portion 816 and an outer portion 820 with the groove 812 located between the lip portion 816 and the outer portion 820.

In one exemplary embodiment, the side joint frame 800 is made of wood or wood-based board (e.g., MDF). One of ordinary skill in the art will appreciate that the side joint frame 800 can be made of any other suitable material. The wood may be shaped, as known in the art, to have a desired decorative appearance. The wood may be treated, such as through application of a paint, laminate, stain, etc. Various foils may be applied to the wood to give the side joint frame 800 a metallic appearance.

The side joint foam is similar to the side foam 702 described above and shown in FIG. 1. The side joint foam includes at least one piece of foam. The side joint frame assembly is formed by attaching one side of the side joint foam to the lower surface 806 of the side joint frame 800. In particular, the side joint foam is attached to the outer portion 820 of the lower surface 806 of the body 802. In one exemplary embodiment, an adhesive is used to attach the side joint foam to the side joint frame 800. In addition to, or instead of, the adhesive, staples can be used to attach the side joint foam to the side joint frame 800.

As shown in FIGS. 9A-9D, the corner template 900 has a body 902 with an upper or front surface 904 and a lower or rear surface 906. The body 902 of the corner template 900 includes a pair of arms 908 that are generally perpendicular to one another. The arms 908 meet at a rounded corner 910 of the body 902. A corner wall 912 is formed at the rounded corner 910 and extends above the upper surface 904 of the body 902. At least one side wall 914 is formed on each of the arms 908 of the body 902, wherein the side walls 914 extend above the upper surface 904 of the body 902. In one exemplary embodiment, a space 916 separates the corner wall 912 from each adjacent side wall 914.

The corner template 900 also includes a lip 918 that extends below the lower surface 906 of the body 902. The lip 918 forms a lower corner 920 having a 90 degree angle corresponding to the generally perpendicular arms 908.

In one exemplary embodiment, the corner template 900 does not include the lip 918 but is otherwise identical to the corner template 900 shown in FIGS. 9A-9D. By not including the lip 918, the corner template 900 can be used on a mirror in which an obstruction (e.g., an adjacent wall) near a corner of the mirror would prevent the lip 918 of the corner template 900 from fitting over the corner of the mirror. Instead, the body 902 of the corner template 900 can be used to align the corner template 900 with the corner of the mirror directly on a top surface of the mirror.

Figure 10A:
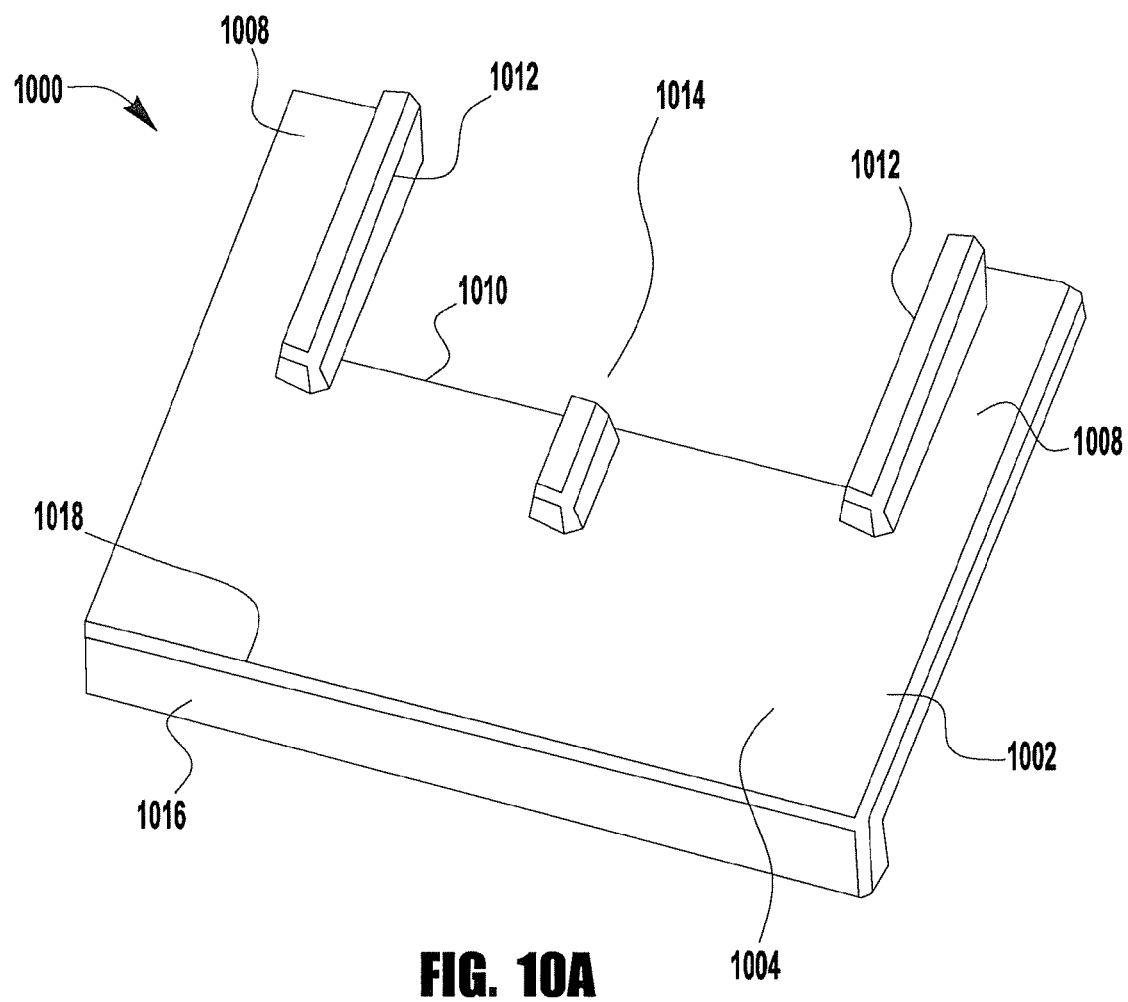
FIGS. 10A-10C show a side template, according to one exemplary embodiment, of the exemplary mirror frame mounting system of FIG. 1.
Figure 10B:
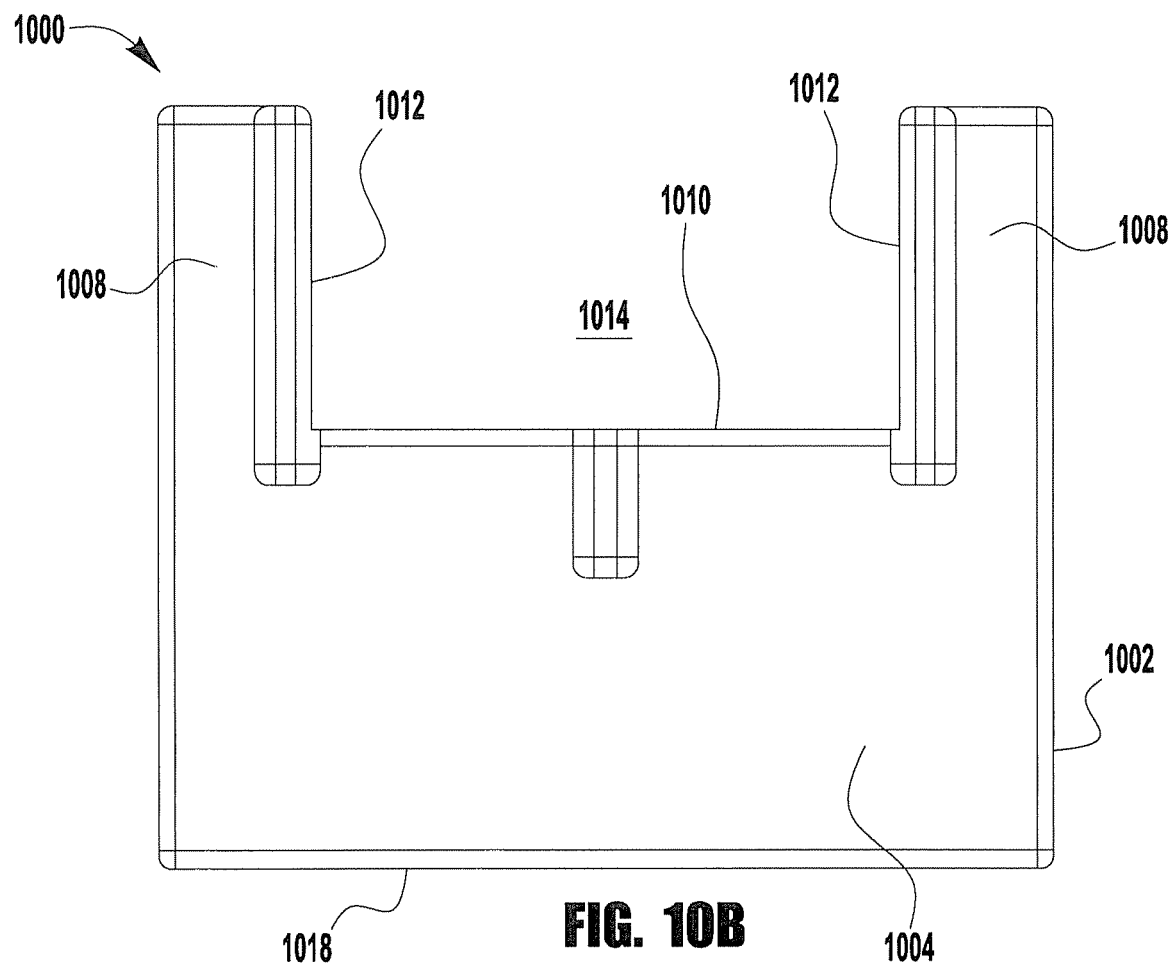
Figure 10C:
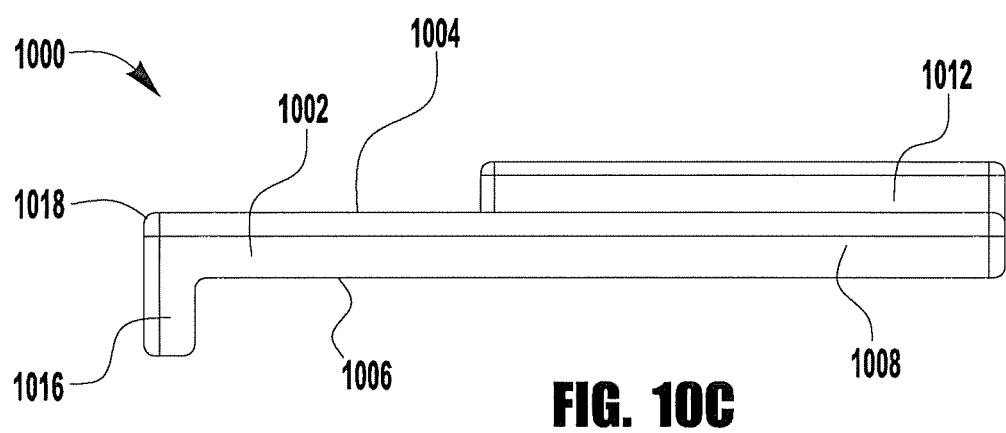

As shown in FIGS. 10A-10C, the side template 1000 has a body 1002 with an upper or front surface 1004 and a lower or rear surface 1006. The body 1002 of the side template 1000 includes a pair of arms 1008 that each extend from and are generally perpendicular to an inner edge 1010 of the body 1002. A side wall 1012 is formed on each of the arms 1008 of the body 1002, wherein the side walls 1012 are generally parallel to one another. The side walls 1012 extend above the upper surface 1004 of the body 1002. A space 1014 is formed between the side walls 1012 and adjacent to the inner edge 1010 of the body 1002.

The side template 1000 also includes a lip 1016 that extends along an outer edge 1018 of the body 1002 of the side template 1000. The lip 1016 is generally parallel to the inner edge 1010 of the body 1002. The lip 1016 extends below the lower surface 1006 of the body 1002.

In one exemplary embodiment, the side template 1000 does not include the lip 1016 but is otherwise identical to the side template 1000 shown in FIGS. 10A-10C. By not including the lip 1016, the side template 1000 can be used on a mirror in which an obstruction (e.g., an adjacent wall) near a side of the mirror would prevent the lip 1016 of the side template 1000 from fitting over the side of the mirror. Instead, the outer edge 1018 of the body 1002 of the side template 1000 can be used to align the side template 1000 with the side of the mirror directly on a top surface of the mirror.

In view of the above, installation of a mirror frame on a mirror using the mirror frame mounting system 100 will now be described. In one exemplary embodiment, four corner bracket assemblies 200 are attached to the corners of the mirror. In particular, the double-sided adhesive tape 228 affixed to the lower surface 210 of the corner bracket 202 is used to adhere the corner bracket 202 to the mirror.

As noted above, the corner template 900 can be used to position the corner bracket assembly 200 on the mirror to insure that the corner bracket 202 adheres at the proper location on the mirror and in the proper orientation relative to the corner of the mirror.

The corner template 900 is placed on the top surface of the mirror such that a corner of the mirror is received in the lower corner 920 of the corner template 900 and sides of the mirror adjacent to the corner of the mirror abut the lip 918 of the corner template 900. In this manner, the corner template 900 is properly positioned relative to the mirror and can be used to position the corner bracket assembly 200 on the mirror.

Once the corner template 900 is properly positioned on the mirror, the rounded corner 214 of the corner bracket 202 is placed against the corner wall 912 of the corner template 900. Furthermore, at least a portion of the arms 212 of the corner bracket 202 are placed against the side walls 914 of the corner template 900. The spaces 916 on the corner template 900 accommodate the fasteners 220 (i.e., the curved upper portions 226 of the fasteners 220) therein. So positioned, the corner bracket 202 can be adhered to the mirror using the double-sided adhesive tape 228 affixed to the lower surface 210 of the body 206 of the corner bracket 202. The corner template 900 can then be moved away from the mounted corner bracket assembly 200 and to a different corner of the mirror to position another corner bracket assembly 200 on the mirror.

In one exemplary embodiment, at least four side bracket assemblies 400 are attached to the sides of the mirror. In particular, the double-sided adhesive tape 420 affixed to the lower surface 410 of the side bracket 402 is used to adhere the corner bracket 402 to the mirror.

As noted above, the side template 1000 can be used to position the side bracket assembly 400 on the mirror to insure that the side bracket 402 adheres at the proper location on the mirror and in the proper orientation relative to the side of the mirror.

The side template 1000 is placed on the top surface of the mirror such that a side of the mirror, on which the side frame 700 is to be mounted, abuts the lip 1016. In this manner, the side template 1000 is properly positioned relative to the mirror and can be used to position the side bracket assembly 400 on the mirror.

Once the side template 1000 is properly positioned on the mirror, the body 406 of the side bracket 402 is received within the space 1014 of the side template 1000. So positioned, the side bracket 402 can be adhered to the mirror using the double-sided adhesive tape 420 affixed to the lower surface 410 of the body 406 of the side bracket 402. The side template 1000 can then be moved away from the mounted side bracket assembly 400 and to another portion on this side, or a different side, of the mirror to position another side bracket assembly 400 on the mirror.

The corner bracket 202 can include enough fasteners 220 to interface with the groove 614 of the corner frame 600 and the grooves 716 of the two side frames 700 adjacent to the corner frame 600. Consequently, in one exemplary embodiment, the corner frames 600 and side frames 700 are mounted on the mirror using only the corner bracket assemblies 200.

As the length of the side frames 700 increases, however, it may be necessary or otherwise beneficial to use one or more side bracket assemblies 400 on one or more sides of the mirror to further or solely support the side frames 700. Furthermore, the side bracket assemblies 400 are needed to support the side joint assemblies, if the side joint assemblies are used.

With the corner bracket assemblies 200 and any side bracket assemblies 400 adhered to the top surface of the mirror, the corner frames 600 and the side frames 700 (as well as any side joint frames 800) can be mounted on the mirror via the corner bracket assemblies 200 and the side bracket assemblies 400.

Each corner frame 600 is pressed onto a corresponding corner bracket 202 such that the fingers 222 of the corner bracket 202 are received in the groove 614 of the corner frame 600. The space 224 between the opposed fingers 222 on the corner bracket 202 allows the opposed fingers 222 to flex toward one another to facilitate the fingers 222 entering the groove 614. Because the width of the groove 614 is wider near the upper surface 606 than the lower surface 608 of the body 604 of the corner frame 600, the fingers 222 begin to unflex as they enter the groove 614. As a result, when the corner frame 600 is pressed onto the corner bracket 202, the curved upper portions 226 of the fingers 222 of the corner bracket 202 exert a force on the walls 616 of the groove 614 to pull the corner frame 600 down onto the corner bracket 202 and firmly hold the corner frame 600 on the corner bracket 202.

As the corner frame 600 is mounted on the corner bracket 202, the corner foam 602 attached to the outer portion 620 of the body 604 of the corner frame 600 is compressed between the body 604 and the top surface of the mirror. The corner foam 602 has a tendency to uncompress which forces the lip portion 618 of the body 604 of the corner frame 600 firmly against the top surface of the mirror and the lower surface 608 of the body 604 of the corner frame 600 away from the top surface of the mirror.

As a result, the corner frame 600 completely conceals the underlying corner bracket 202, while the lip portion 618 rests firmly on the top surface of the mirror in an aesthetically pleasing manner. The corner frame 600 can also be readily removed from the corner bracket 202 by lifting the corner frame 600 off of the corner bracket 202, which again causes the opposed fingers 222 to flex toward one another to facilitate the fingers 222 exiting the groove 614.

Each side frame 700 is pressed onto a corresponding side bracket 402 such that the fingers 414 of the side bracket 402 are received in the groove 716 of the side frame 700. As noted above, in one exemplary embodiment, the side frame 700 can be pressed onto a corner bracket 202 in addition to or instead of the side bracket 402. The space 416 between the opposed fingers 414 on the side bracket 402 allows the opposed fingers 414 to flex toward one another to facilitate the fingers 414 entering the groove 716. Because the width of the groove 716 is wider near the upper surface 706 than the lower surface 708 of the body 704 of the side frame 700, the fingers 414 begin to unflex as they enter the groove 716. As a result, when the side frame 700 is pressed onto the side bracket 402, the curved upper portions 418 of the fingers 414 of the side bracket 402 exert a force on the walls 718 of the groove 716 to pull the side frame 700 down onto the side bracket 402 and firmly hold the side frame 700 on the side bracket 402.

As the side frame 700 is mounted on the side bracket 402, the side foam 702 attached to the outer portion 722 of the body 704 of the side frame 700 is compressed between the body 704 and the top surface of the mirror. The side foam 702 has a tendency to uncompress which forces the lip portion 720 of the body 704 of the side frame 700 firmly against the top surface of the mirror and the lower surface 708 of the body 704 of the side frame 700 away from the top surface of the mirror.

As a result, the side frame 700 completely conceals the underlying side bracket 402, while the lip portion 720 rests firmly on the top surface of the mirror in an aesthetically pleasing manner. The side frame 700 can also be readily removed from the side bracket 402 by lifting the side frame 700 off of the side bracket 402, which again causes the opposed fingers 414 to flex toward one another to facilitate the fingers 414 exiting the groove 716.

Furthermore, with the side frame 700 mounted, each short side 710 of the body 704 of the side frame 700 is received in a recess 612 of an adjacent corner frame 600 or a recess 810 of an adjacent side joint frame 800. A profile of the recess 612 or 810 will generally correspond to a profile of the short sides 710 of the side frame 700. In this manner, the edges of the short sides 710 of the side frames 700 are concealed from view, which contributes to the aesthetic appearance of the overall frame.

The above description of specific embodiments has been given by way of example. From the disclosure given, those skilled in the art will not only understand the general inventive concept and its attendant advantages, but will also find apparent various changes and modifications to the structures and methods disclosed. For example, one of ordinary skill in the art will appreciate that the frame could comprise four side frames and no corner frames. As another example, the corner brackets and/or side brackets can have any projection suitable for interfacing with the groove on the lower surface of the frame. As yet another example, the groove could be formed as discontinuous grooves instead a single continuous groove in each of the frame components. It is sought, therefore, to cover all such changes and modifications as fall within the spirit and scope of the general inventive concept, as defined by the appended claims, and equivalents thereof.

The invention claimed is:

1. A system for framing a pre-mounted structure, the system comprising: a bracket for attaching to one of the pre-mounted structure and an area adjacent to the pre-mounted structure; and a frame component, wherein the bracket includes a fastener having a first finger and a second finger, the first finger and the second finger separated by a space so that the first finger and the second finger flex toward one another, wherein the frame component includes a groove with a pair of opposed side walls having a predetermined slope, wherein after attachment of the bracket to one of the pre-mounted structure and the area adjacent to the pre-mounted structure: the frame component attaches to the bracket by pressing the frame component onto the bracket such that the fastener on the bracket enters the groove, and the frame component detaches from the bracket by pulling the frame component off of the bracket such that the fastener on the bracket exits the groove.

2. The system of claim 1, wherein the bracket is one of a corner bracket and a side bracket.

3. The system of claim 1, wherein the frame component is one of a frame corner component and a frame side component.

4. The system of claim 3, wherein the frame corner component includes a recess for interfacing with an end of a frame side component adjacent to the frame corner component.

5. The system of claim 3, further comprising a frame joint component for mounting between a first frame side component and a second frame side component which are substantially aligned with one another, and wherein the frame joint component includes a pair of opposed recesses for interfacing with an end of the first frame side component and an end of the second frame side component respectively.

6. The system of claim 1, wherein a lower surface of the frame component includes a lip portion and an outer portion, wherein the lip portion is closer to a center of the pre-mounted structure than the outer portion, wherein the groove is formed between the lip portion and the outer portion, and wherein after the frame component is attached to the bracket, the lip portion contacts the pre-mounted structure and the outer portion does not contact the pre-mounted structure.

7. The system of claim 6, wherein a resilient member is disposed on the outer portion, and wherein the resilient member urges the lip portion against the pre-mounted structure when the frame component is mounted on the bracket.

8. The system of claim 7, wherein the resilient member is a foam strip.

9. The system of claim 1, wherein each of the first finger and the second finger has a curved upper portion.

10. The system of claim 1, wherein the side walls of the groove form an angle of 30 degrees relative to one another.

11. The system of claim 1, wherein the bracket is concealed from view when the frame component is mounted on the bracket.

12. The system of claim 1, wherein the bracket is semi-permanently attached to one of the pre-mounted structure and the area adjacent to the pre-mounted structure using double-sided adhesive tape affixed to a lower surface of the bracket.

13. The system of claim 1, wherein the pre-mounted structure is a mirror.

14. The system of claim 1, further comprising a template for positioning the bracket on the pre-mounted structure.

15. A system for framing a pre-mounted structure, the system comprising:

a plurality of brackets for attaching to one of the pre-mounted structure and an area adjacent to the pre-mounted structure; and a plurality of frame components, wherein each of the brackets includes at least one fastener, wherein each of the frame components includes a groove, wherein after attachment of the brackets to one of the pre-mounted structure and the area adjacent to the pre-mounted structure:

the frame components are operable to attach to the brackets by pressing the frame components onto the brackets such that the fasteners on the brackets enter the grooves, and the frame components are operable to detach from the brackets by pulling the frame components off of the brackets such that the fasteners on the brackets exit the grooves, wherein a lower surface of each of the frame components includes a lip portion and an outer portion, wherein the lip portion is closer to a center of the pre-mounted structure than the outer portion, wherein the groove is formed between the lip portion and the outer portion, wherein after the frame component is attached to the bracket, the lip portion contacts the pre-mounted structure and the outer portion does not contact the pre-mounted structure, wherein each of the fasteners includes a first finger and a second finger, and wherein the first finger and the second finger are separated by a space so that the first finger and the second finger can flex toward one another.

16. The system of claim 4, wherein an upper surface of the end of the frame side component has a non-planar profile, and wherein the recess of the frame corner component is shaped to conform to the non-planar profile of the frame side component.

17. The system of claim 5, wherein the pair of opposed recesses of the frame joint component consists of a first recess and a second recess, wherein an upper surface of the end of the first frame side component has a non-planar profile, wherein the first recess of the frame joint component is shaped to conform to the non-planar profile of the first frame side component, wherein an upper surface of the end of the second frame side component has a non-planar profile, and wherein the second recess of the frame joint component is shaped to conform to the non-planar profile of the second frame side component.

* * * * *